(12) United States Patent
Choukroun et al.

(10) Patent No.: US 11,343,650 B1
(45) Date of Patent: May 24, 2022

(54) COMPUTATION OF A SADDLE-POINT

(71) Applicant: HUAWEI TECHNOLOGIES CO., LTD., Shenzhen (CN)

(72) Inventors: Yoni Choukroun, Hod Hasharon (IL); Michael Zibulevsky, Jerusalem (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/131,753

(22) Filed: Dec. 23, 2020

(51) Int. Cl.
*H04W 4/029* (2018.01)
*G06N 20/00* (2019.01)
*H04L 67/52* (2022.01)
*G06K 9/62* (2022.01)

(52) U.S. Cl.
CPC .......... *H04W 4/029* (2018.02); *G06K 9/6247* (2013.01); *G06N 20/00* (2019.01); *H04L 67/18* (2013.01)

(58) Field of Classification Search
CPC ..... H04W 4/029; G06N 20/00; G06K 9/6247; H04L 67/18
See application file for complete search history.

(56) References Cited

U.S. PATENT DOCUMENTS

2020/0258255 A1    8/2020  Aleem et al.

FOREIGN PATENT DOCUMENTS

| CN | 105335332 A | 2/2016 |
|---|---|---|
| CN | 108805916 A | 11/2018 |
| CN | 108875927 A | 11/2018 |
| CN | 110766628 A | 2/2020 |

OTHER PUBLICATIONS

Cherukuri, Ashish, Bahman Gharesifard, and Jorge Cortes. "Saddle-point dynamics: conditions for asymptotic stability of saddle points." SIAM Journal on Control and Optimization 55.1 (2017): 486-511. (Year: 2017).*

Akimoto, Youhei. "Saddle point optimization with approximate minimization oracle." arXiv preprint arXiv:2103.15985 (2021). (Year: 2021).*

(Continued)

*Primary Examiner* — Srilakshmi K Kumar
*Assistant Examiner* — Umair Ahsan
(74) *Attorney, Agent, or Firm* — Leydig, Voit & Mayer, Ltd.

(57) ABSTRACT

An unconstrained saddle point of a function is obtained by computing a combination of a first subspace for minimization, and a second subspace for maximization. A combination of a current location including a first and second current location within the first and second subspace is iteratively selected. From the current location, a combination of a step-size including a first and second step-size along a first and second direction of the first and second subspace, is computed. The first and second step-size is to a next first and second location within the first and second subspace. The current location is set to a next location including the next first and second location. The combination of the first and second subspace is according to the next location. The iterations terminate when the next location meets a requirement denoting the unconstrained saddle point. The location indicating the unconstrained saddle point is provided.

15 Claims, 12 Drawing Sheets

(56) References Cited

OTHER PUBLICATIONS

Conn et al., "On Iterated-Subspace Minimization Methods for Nonlinear Optimization," Total 33 pages (Jan. 16, 2018).
Daskalakis et al., "Training GANs with Optimism," ICLR 2018 Conference, Total 8 pages (Feb. 15, 2018).
Choukroun et al., "Sequential Subspace Optimization Method for Saddle-point Problems," pp. 1-11 (Aug. 2020).
Daskalakis et al., "Training GANs with Optimism" pp. 1-30 (Feb. 2018).
PCT/CN2021/140084, International Search Report, dated Mar. 23, 2022.

\* cited by examiner

Require: $c \in [0,1), \nu \in (0,1), \eta \leq 1$
 Input: $f: \mathbb{R}^{M+N} \to \mathbb{R}$, current point $z_k$, direction $d_k$
 Output: Step size $\eta$
 while $\|\nabla f(z_k + \eta d_k)\|^2 \geq \|\nabla f(z_k)\|^2 + \eta c \nabla f(z_k)^T \nabla^2 f(z_k) d_k$ do
  $\eta = \eta * \nu$
 end while
 return $\eta$

FIG. 8

Require: $z_0 = (x_0, y_0)$, $d$ the maximum subspace dimension, $K$ the maximum number of iterations, $\epsilon$ the machine precision
Input: $f : (\mathbb{R}^M \times \mathbb{R}^N) \to \mathbb{R}$, initial point $(x_0, y_0)$
Output: $(x_{final}, y_{final})$
$\tau \in \mathbb{R}_0^+, \nu \in (0, 1)$
Initialize proximal centers $\bar{x}_0, \bar{y}_0$
for $k = 0, 1, ..., K$ do ▷ *Outer loop of the method*
   if $\|\nabla f(x_k, y_k)\| < \epsilon$ then: return $(x_k, y_k)$
   if $\|\nabla \tilde{f}(x_k, y_k)\| < \epsilon$ then: $\tau = \nu\tau$
   Update $P_k$ and $Q_k$ with current gradients
   Set $t = 0$ and $\gamma_t = 0$
   while $\|\nabla_\gamma \tilde{f}(z_k + R_k\gamma_t)\| > \epsilon$ do ▷ *Inner loop of the method: Subspace optimization*
      $\tilde{\gamma} = -H_\gamma^{-1}(z_k + R_k\gamma_t)\nabla_\gamma \tilde{f}(z_k + R_k\gamma_t)$, eq. (11).
      Find inner step size $\eta_{in}$ following Algorithm 1 over subspace objective
      Set $\gamma_{t+1} = \gamma_t + \eta_{in}\tilde{\gamma}$ and $t = t + 1$
   end while
   Find outer step size $\eta_{out}$ following Algorithm 1
   Update $z_{k+1} = z_k + \eta_{out} R_k \gamma_t$
   if $dim(P_k) > d - 1$ then: Remove the oldest direction from $P_k$ and $Q_k$
   Update $P_{k+1}$ and $Q_{k+1}$ with search steps and/or gradients
   Update proximal centers $\bar{x}_k, \bar{y}_k$ (e.g with $x_k$ and $y_k$)
end for
return $(x_K, y_K)$

FIG. 9

COMPUTATION OF A SADDLE-POINT

BACKGROUND

The present disclosure, in some embodiments thereof, relates to computational performance and, more specifically, but not exclusively, to systems and methods for improving a computer computing a saddle-point, for example, for training a generative adversarial network (GAN).

A saddle point is a location within a function where slopes in all orthogonal directions are all zero. The saddle point may represent an optimal tradeoff between conflicting constraints of a system.

A GAN is a type of machine learning approach, where two neural networks contest with each other in the form of a zero-sum game in order to train one of the neural networks to generate new data with the same statistics as a training dataset that cannot be distinguished by the other neural network from the training dataset.

SUMMARY

According to a first aspect, an apparatus for computing an unconstrained saddle point of a function of a plurality of variables, comprises: a processor and a non-transitory storage medium, the non-transitory storage medium carrying a code which, when executed by the processor, causes the processor to: compute, for the function, a combination of a first subspace denoting a first set of variable of the function for minimization, and a second subspace denoting a second set of variables of the function for maximization, wherein a dimension of the first subspace and the second subspace is smaller than a dimension of the function, and, in a plurality of iterations: select a combination of a current location including a first current location within the first subspace and a second current location within the second subspace, compute, from the combination of the current location, a combination of a direction including a first direction along the first subspace denoting a maximal of a first gradient at the first current location of the first subspace, and a second direction along the second subspace denoting a minimal of a second gradient at the second current location of the second subspace, compute a combination of a step-size including a first step-size from the first current location along the first direction of the first subspace, and a second step-size from the second current location along the second direction of the second subspace, the first step-size to a next first location within the first subspace and the second step-size to a next second location within the second subspace, set the combination of the current location to a combination of the next location including the next first location and the next second location, update the combination of the first subspace and the second subspace according to the next location, and terminate the iterations when the next location meets a requirement denoting the unconstrained saddle point.

According to a second aspect, a method of computing an unconstrained saddle point of a function of a plurality of variables, comprises: computing, for the function, a combination of a first subspace denoting a first set of variable of the function for minimization, and a second subspace denoting a second set of variables of the function for maximization, wherein a dimension of the first subspace and the second subspace is smaller than a dimension of the function, in a plurality of iterations: selecting a combination of a current location including a first current location within the first subspace and a second current location within the second subspace, computing, from the combination of the current location, a combination of a direction including a first direction along the first subspace denoting a maximal of a first gradient at the first current location of the first subspace, and a second direction along the second subspace denoting a minimal of a second gradient at the second current location of the second subspace, computing a combination of a step-size including a first step-size from the first current location along the first direction of the first subspace, and a second step-size from the second current location along the second direction of the second subspace, the first step-size to a next first location within the first subspace and the second step-size to a next second location within the second subspace, setting the combination of the current location to a combination of the next location including the next first location and the next second location, updating the combination of the first subspace and the second subspace according to the next location, and terminating the iterations when the next location meets a requirement denoting the unconstrained saddle point.

According to a third aspect, a computer program product for computing an unconstrained saddle point of a function of a plurality of variables, comprising non-transitory medium storing a computer program which, when executed by at least one hardware processor, cause the at least one hardware processor to perform: computing, for the function, a combination of a first subspace denoting a first set of variable of the function for minimization, and a second subspace denoting a second set of variables of the function for maximization, wherein a dimension of the first subspace and the second subspace is smaller than a dimension of the function, in a plurality of iterations: selecting a combination of a current location including a first current location within the first subspace and a second current location within the second subspace, computing, from the combination of the current location, a combination of a direction including a first direction along the first subspace denoting a maximal of a first gradient at the first current location of the first subspace, and a second direction along the second subspace denoting a minimal of a second gradient at the second current location of the second subspace, computing a combination of a step-size including a first step-size from the first current location along the first direction of the first subspace, and a second step-size from the second current location along the second direction of the second subspace, the first step-size to a next first location within the first subspace and the second step-size to a next second location within the second subspace, setting the combination of the current location to a combination of the next location including the next first location and the next second location, updating the combination of the first subspace and the second subspace according to the next location, and terminating the iterations when the next location meets a requirement denoting the unconstrained saddle point.

In at least some implementations, the approach described herein improves a computer computing the saddle point for a function, by reducing the amount of computational time to compute the saddle point and/or reduce the amount of computational hardware resources (e.g., processors, memory, data storage) used for computing the saddle point in comparison to standard approaches and/or known approaches. For example, the reduction in computational time and/or computational hardware resources arises due to the ability of the approach described herein to arrive at a solution, i.e., compute the saddle point. In contrast, standard approaches and/or known approaches may encounter situations in which the solution diverges and/or requires infinite iterations.

In at least some implementations, the approach described herein provides at most a linear growth in computational time and/or computational hardware resources with the problem dimension. In contrast, standard approaches and/or known approaches grow exponentially, which limits the use of such approaches for problems with many dimensions.

In at least some implementations, the approach described herein converges to the saddle point in functions that are not strictly convex-concave. In contrast, standard approaches such as naïve gradient methods do not guarantee convergence in functions that are not strictly convex-concave, leading instead to diverging oscillatory solutions.

In a further implementation form of the first, second, and third aspects, the function denotes a generative adversarial network (GAN), and further comprising code which, when executed by the processor, causes the processor to: provide a training dataset of training data elements for training the GAN, provide the GAN comprising a discriminator network and a generator network, wherein the function denotes a combination of generation of candidate data elements by the generator and ability of the discriminator network to distinguish the generated candidate data elements from a distribution of the training data elements, and train the generator network to generate candidate data elements that the discriminator cannot statistically significantly distinguish from the distribution of the training data elements by computing the unconstrained saddle point of the function.

In a further implementation form of the first, second, and third aspects, the dimension of the first subspace and the second subspace is 10 or less.

In at least some implementations, the 10 or less dimensions of the first and second subspace enable computing the directions along the first and second substances for the next location in a computationally practical manner (i.e., reasonable processing time and/or reasonable computational resources), for example, using second order optimization approaches such as Newton. Such second order optimizations cannot be computed in a practical manner for larger dimensions, for example, for the function itself rather than for the first and second subspaces.

In a further implementation form of the first, second, and third aspects, the step-size is a combination of a first step-size within the first subspace and a second step-size within the second subspace, and further comprising defining a first maximal value for the first step-size, and a second maximal value for the second.

In at least some implementations, the proximal approach reduces oscillation behavior which may occur in min-max games, and/or improves stability of the subspace optimization procedure. The proximal approach helps ensure the existence of a saddle-point in potentially degenerate substances, avoiding divergence, in a trust-region fashion.

In a further implementation form of the first, second, and third aspects, the first maximal value for the first step-size is set according to a moving average over a plurality of previous first step-sizes computed from a plurality of previous iterations, and the second maximal value for the second step-size is set according to a moving average over a plurality of previous second step-sizes computed from a plurality of previous iterations.

In at least some implementations, the reduction in oscillation and/or improvement of the stability may be based on averaging over iterations provided by the proximal approach.

In a further implementation form of the first, second, and third aspects, further comprising code which, when executed by the processor, causes the processor to compute the step-size based on a norm of a gradient at the current location of the combination of the first subspace and the second subspace in the direction.

In at least some implementations, performing a backtracking line search over the norm of the gradient of the combination of the first subspace and the second subspace ensures faster convergence and/or prevents potential divergence after the inner subspace optimization. Common line-search backtracking approaches which are used for to find only a minimum for a function, or only a maximum for a function, cannot be applied straightforwardly to saddle-point problems, since implementing such line-search over the function's (x,y) values for which simultaneous minimization and maximization is south may diverge (e.g., bi-linear game).

In a further implementation form of the first, second, and third aspects, compute the step-size comprises: select an initial value of the step-size, and iteratively reduce the initial value of the step-size until the norm of the gradient at a candidate next location defined as the initial value of the step-size from current location in the direction, is below the norm of the gradient at the current location plus a threshold value.

In a further implementation form of the first, second, and third aspects, the combination of the direction is computed using a second order optimization approach.

In a further implementation form of the first, second, and third aspects, the second order optimization approach is based on Newton's method in optimization.

In at least some implementations, the 10 or less dimensions of the first and second subspace enable computing the directions along the first and second substances for the next location in a computationally practical manner (i.e., reasonable processing time and/or reasonable computational resources), for example, using second order optimization approaches such as Newton. Such second order optimizations cannot be computed in a practical manner for larger dimensions, for example, for the function itself rather than for the first and second subspaces.

In a further implementation form of the first, second, and third aspects, each one of the first subspace and the second subspace include at least three dimensions.

In at least some implementations, the at least 3 dimensions define the minimum amount of data that is needed in order to compute the saddle point according to the approach described herein.

In a further implementation form of the first, second, and third aspects, the at least three dimensions of the first subspace include a first current gradient of the first current location, and a second current gradient of the second current location.

In a further implementation form of the first, second, and third aspects, the at least three dimensions of the first subspace include a first previous gradient of a previous first location, and a second previous gradient of a previous second location.

In a further implementation form of the first, second, and third aspects, the at least three dimensions of the first subspace include a first previous direction and a first previous step-size of a previous first location, and a second previous direction and a second previous step-size of a previous second location.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 8 is a pseudocode for a process that performs a saddle backtracking line search, in accordance with some embodiments; and FIG. 9 is a pseudocode for sequential subspace optimization framework for saddle-point problems, in accordance with some embodiments.

DETAILED DESCRIPTION

Figure 1:
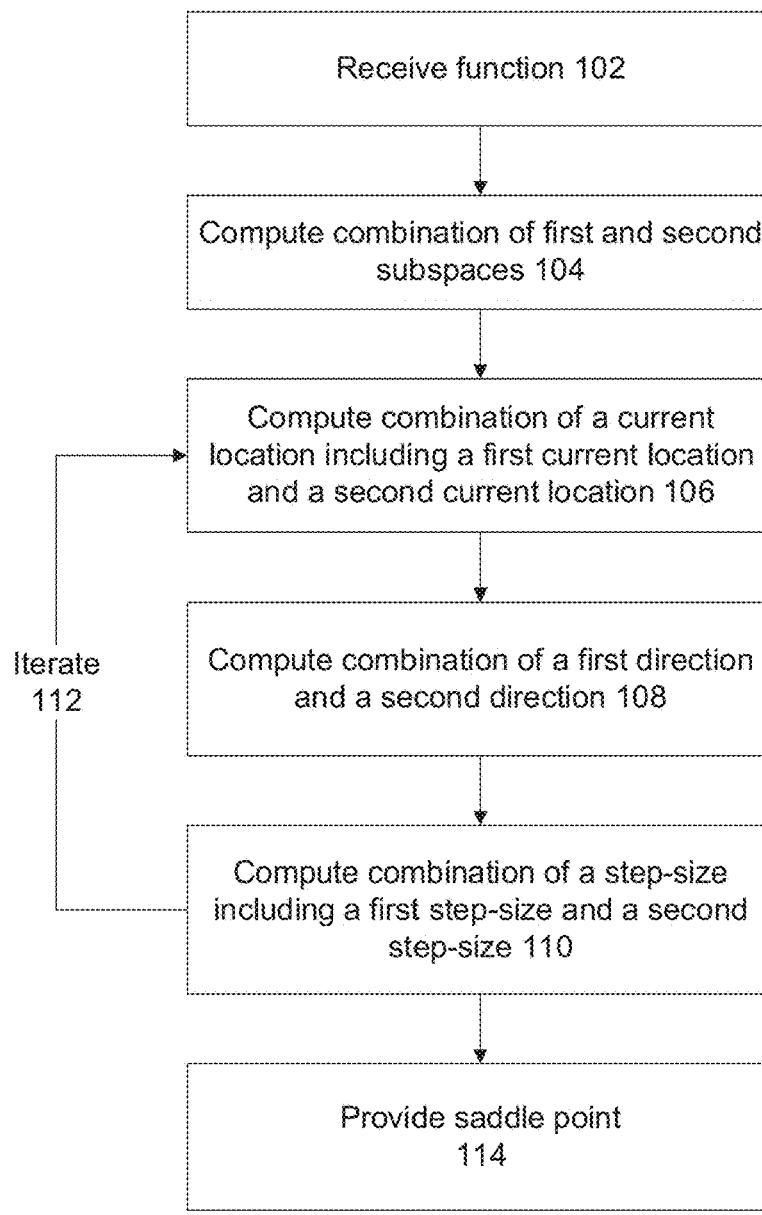
FIG. 1 is a flowchart of a method of computing an unconstrained saddle point of a function of variables, in accordance with some embodiments.

The present disclosure, in some embodiments thereof, relates to computational performance and, more specifically, but not exclusively, to systems and methods for improving a computer computing a saddle-point, for example, for training a generative adversarial network (GAN).

An aspect of some embodiments of the present disclosure relates to systems, methods, an apparatus (e.g., processor, computing device), and/or code instructions (i.e., stored on a memory and executable by a processor) for computing an unconstrained saddle point of a function of multiple variables, for example, a function defining a combination of generation of candidate data elements by a generator of a generative adversarial network (GAN) and ability of a discriminator network of the GAN to distinguish the generated candidate data elements from a distribution of the training data elements. A combination of a first substance denoting a first set of variable of the function is defined for minimization thereof. A second subspace denoting a second set of variables of the function is defined for maximization therefore. A dimension of the first subspace and the second subspace is smaller than a dimension of the function. The subspace is iteratively searched, in a step-wise manner, to identify the saddle point within the subspace.

In multiple iterations a combination of a current location including a first current location within the first subspace and a second current location within the second subspace is selected. From the combination of the current location, a combination of a step-size including a first step-size from the first current location along the first direction of the first subspace, and a second step-size from the second current location along the second direction of the second subspace, is computed. The first step-size is to a next first location within the first subspace and the second step-size is to a next second location within the second subspace. The combination of the current location is set to a combination of the next location including the next first location and the next second location. The combination of the first subspace and the second subspace is according to the next location. The iterations terminate when the next location meets a requirement denoting the unconstrained saddle point. The location indicating the unconstrained saddle point is provided.

In at least some implementations, the approach described herein improves a computer computing the saddle point for a function, by reducing the amount of computational time to compute the saddle point and/or reduce the amount of computational hardware resources (e.g., processors, memory, data storage) used for computing the saddle point in comparison to standard approaches and/or known approaches. For example, the reduction in computational time and/or computational hardware resources arises due to the ability of the approach described herein to arrive at a solution, i.e., compute the saddle point. In contrast, standard approaches and/or known approaches may encounter situations in which the solution diverges and/or requires infinite iterations.

In at least some implementations, the approach described herein provides at most a linear growth in computational time and/or computational hardware resources with the problem dimension. In contrast, standard approaches and/or known approaches grow exponentially, which limits the use of such approaches for problems with many dimensions.

At least some implementations of the systems, methods, apparatus, and/or code instructions described herein address the technical problem of solving saddle-point problems in a computationally efficient manner. At least some implementations of the systems, methods, apparatus, and/or code instructions described herein improve a computer solving a saddle-point problem by reducing the amount of memory, data storage, utilization of processing hardware, and/or reducing processing time, for solving the saddle-point problem in comparison to traditional approaches.

Saddle-point problems arise in many applications, such as game theory, for example, as described with reference to [20], constrained and robust optimization, for example, as described with reference to [1, 2] and/or generative adversarial networks (GANs), for example, as described with reference to [16]. Important variational problems such as $l_\infty$ minimization, convex segmentation or compressed sensing, for example, as described with reference to [7, 5] have saddle-point formulations that are efficiently handled using primal-dual solvers.

Convex-concave saddle point problems have been widely investigated in the context of constrained optimization problems that are reduced to finding the saddle-point of a corresponding Lagrangian. Gradient methods are computationally efficient and proven to be convergent under strict convexity or concavity of the primal-dual variables, for example, as described with reference to [1, 35, 6, 8]. Nevertheless, there is a broad spectrum of problems wherein a function considered is not strictly convex-concave. At least some implementations of the systems, methods, apparatus, and/or code instructions described herein compute the saddle-point for functions that are not strictly convex-concave, in a computationally efficient manner, in contrast to standard approaches.

Moreover, it has been observed that when using the naive gradient method, convergence is not guaranteed, leading instead to diverging oscillatory solutions, for example, as described with reference to [1, 27, 15, 38]. Following the solution described with reference to [30] on specific convex-concave setting, [29] proposed a proximal method as described with reference to [37] for saddle-point problem with sub-linear convergence rate. Later, [31] provided a worst-case optimal dual averaging scheme with proven sub-linear convergence for general smooth convex-concave problems. In the emerging topic of generative adversarial networks, many new approaches have been proposed or re-investigated, for example, as described with reference to [18, 19, 36, 11, 24]. However, gradient based methods suffer from the coupling term usually present in min-max games, for example, as described with reference to [21], and remain inherently slow especially in ill-conditioned problems. At least some implementations of the systems, methods, apparatus, and/or code instructions described herein guarantee convergence when computing the saddle-point for functions, in a computationally efficient manner, in contrast to standard approaches where convergence is not guaranteed.

At least some implementations of the systems, methods, apparatus, and/or code instructions described herein provide, optionally for the case of large scale optimization problems, a computationally efficiency approach where storage requirement and/or computational cost per iteration grow at most linearly with the problem dimensions. In contrast to the approach described in the present disclosure, in the context of minimization, this constraint has led to the development of a broad family of methods such as variable metric methods, and subspace optimization. The most simple (and ubiquitous) subspace minimization algorithm is steepest descent coupled with line-search procedure. Early methods proposed to extend the minimization to a k dimensional subspace spanned by various directions, such as gradients, conjugate directions, previous outer iterations or Newton directions, for example, as described with reference to [10, 25, 13, 9]. One standard approach of this type is the Conjugate Gradient (CG) method, as described with reference to [17], that possesses a remarkable linear convergence rate induced by the well-known expanding manifold property of quadratic CG. In the case of general smooth convex functions, preserving the expanding manifold property enables linear convergence rate of CG, but the cost of each iteration increases with the iteration count, and thus makes it computationally prohibitive. To alleviate this problem, [28] suggested to restrict the optimization subspace to the span of the current gradient, the average of previous steps and a weighted sum of previous gradients. The resulting ORTH-method inherits the optimal worst-case convergence, but fails to preserve CG convergence rate for quadratic objective, leading to slower convergence in the neighborhood of a solution. To address this problem the SEquential Subspace OPtimization (SESOP) method [26] extends the ORTH subspaces with the directions of the last propagation steps. However, all of the previously discussed approaches based on subspaces are based on either computing only a minimum value for a function, or computing only a maximum value for a function. In contrast, at least some implementations of the systems, methods, apparatus, and/or code instructions described herein search a subspace of the function to identify a simultaneous minimum and maximum value for the function, indicative of the saddle-point.

At least some implementations of the systems, methods, apparatus, and/or code instructions described herein address technical problem of the inherent slowness of gradient based methods and/or the power of subspace optimization. At least some implementations of the systems, methods, apparatus, and/or code instructions described herein address the mentioned technical problem, and/or improve the technical field of finding saddle-points in a function, and/or improve the performance of a computer computing saddle-points for a function, by extending the idea of subspace optimization to saddle-point problems.

At least some implementations of the systems, methods, apparatus, and/or code instructions described herein address the mentioned technical problem, and/or improve the technical field of finding saddle-points in a function, and/or improve the performance of a computer computing saddle-points for a function, by sequentially solving low dimensional saddle-point problems in subspaces defined by first-order information. In at least some implementations, the subspace optimization over the primal and dual variables, allowing to search for a saddle-point in a richer subspace, wherein the function can increase and/or decrease in primal and dual variables respectively. In at least some implementations, the saddle-point objective is coupled with proximal operators in order to ensure the existence of a stationary point in the subspace. In at least some implementations, the subspace optimization is solved via adapted second order optimization that can be implemented efficiently in the given low dimensional subspace. In at least some implementations, backtracking line search is performed over the gradient norm. This ensures faster convergence, and most importantly, prevents divergence in degenerative cases. Experimental results described in the "Examples" section below provide evidence that at least some implementations of the approach described herein improve a computer (e.g., in terms of lower memory requirements, lower data storage requirements, lower processor requirements, and/or lower processing time) computing a saddle-point for a function in comparison to other standard approaches.

At least some implementations of the systems, methods, apparatus, and/or code instructions described herein address the technical problem of training a generative adversarial network (GAN) based on solving saddle-point problems in a computationally efficient manner. At least some implementations of the systems, methods, apparatus, and/or code instructions described herein improve the process of training the GAN by reducing the amount of memory, data storage, utilization of processing hardware, and/or reducing processing time, for training the GAN based on solving the saddle-point problem in comparison to traditional approaches.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
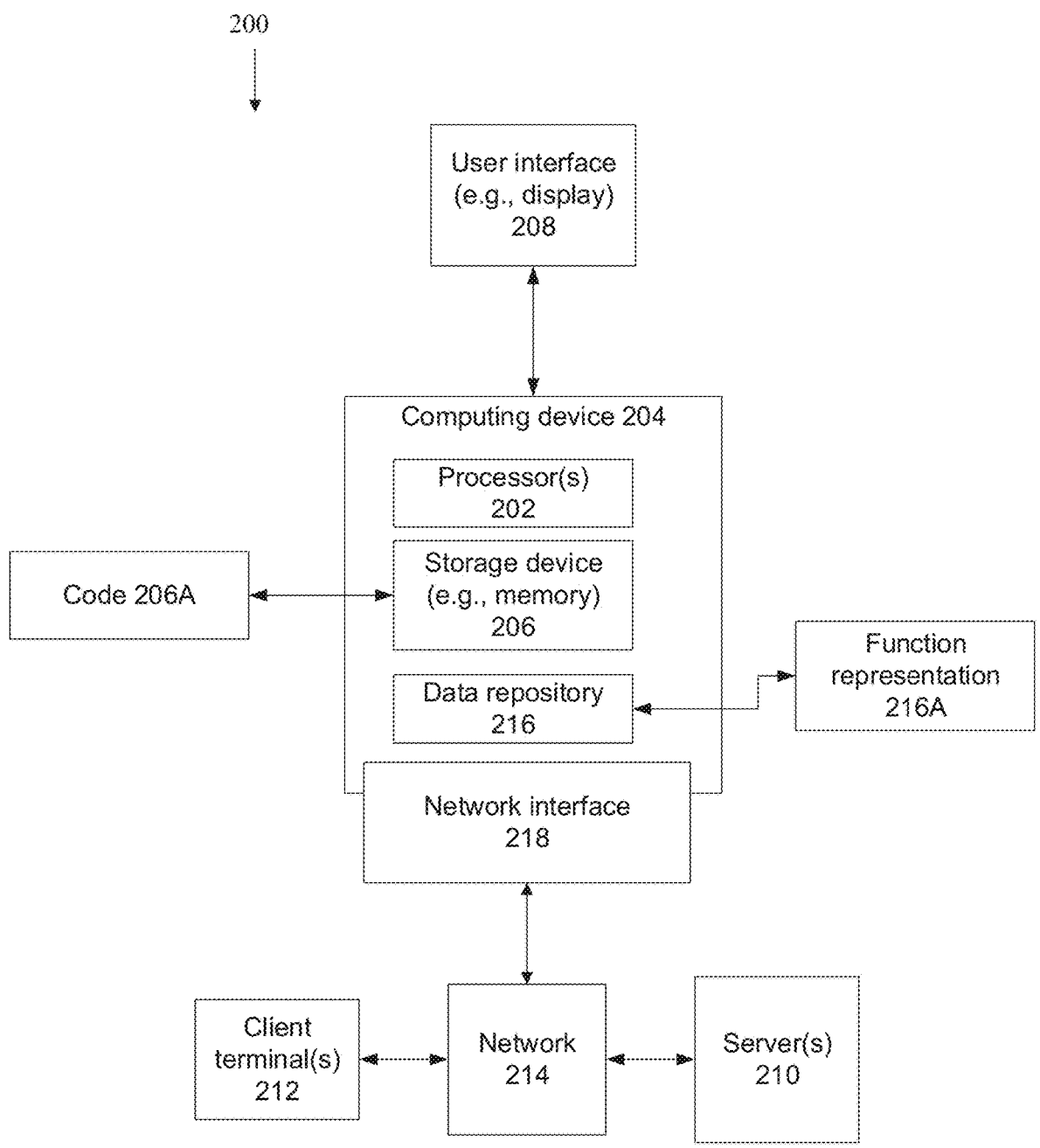
FIG. 2 is a block diagram of components of a system for computing an unconstrained saddle point of a function of variables, in accordance with some embodiments.

Reference is now made to FIG. 1, which is a flowchart of a method of computing an unconstrained saddle point of a function of variables, in accordance with some embodiments. Reference is also made to FIG. 2, which is a block diagram of components of a system 200 for computing an unconstrained saddle point of a function of variables, in accordance with some embodiments. System 200 may implement the acts of the method described with reference to FIG. 1, by processor(s) 202 of a computing device 204 executing code instructions (e.g., code 206A) stored in a memory 206.

Multiple architectures of system 200 based on computing device 204 may be implemented. In an exemplary implementation, computing device 204 storing code 206A may be implemented as one or more servers (e.g., network server, web server, a computing cloud, a virtual server) that provides centralized services for solving saddle problems defined by functional representations (e.g., one or more of the acts described with reference to FIGS. 1 and/or 3) to one or more client terminals 212 over a network 214, for example, providing software as a service (SaaS) to the client terminal(s) 212, providing software services accessible using a software interface (e.g., application programming interface (API), software development kit (SDK)), providing an application for local download to the client terminal(s) 212, and/or providing functions using a remote access session to the client terminals 212, such as through a web browser. For example, multiple users use their respective client terminals 212 to provide their respective functional representations 216A to centralized computing device 204, and receiving a solution to the saddle problem defined by the functional representation 216A from computing device 204. In another example, computing device 204 may include locally stored software (e.g., code 206A) that performs one or more of the acts described with reference to FIGS. 1 and/or 3, for example, as a self-contained client terminal that is designed to be used by users of the client terminal. In such implementation, the solution to the saddle problem defined by the functional representation 216A is locally solved.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A that implements one or more features and/or acts of the method described with reference to FIG. 1 when executed by processor(s) 202.

Computing device 204 may include a data repository 216 for storing data, for example, a functional representation repository that stores one or more functional representations 216A for which a solution to the saddle problem is computed. Data repository 216 may be implemented as, for example, a memory, a local hard-drive, virtual storage, a removable storage unit, an optical disk, a storage device, and/or as a remote server and/or computing cloud (e.g., accessed using a network connection).

Network 214 may be implemented as, for example, the internet, a local area network, a virtual private network, a wireless network, a cellular network, a local bus, a point to point link (e.g., wired), and/or combinations of the aforementioned.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may connect using network 214 (or another communication channel, such as through a direct link (e.g., cable, wireless) and/or indirect link (e.g., via an intermediary computing unit such as a server, and/or via a storage device) with server(s) 210 and/or client terminal(s) 212. Server 210 may, for example, store updated versions of code 206A, store functional representations 216A, and/or receive the computed solution to the saddle problem defined by the functional representation 216A. Client terminal(s) 212 may be used by users remotely accessing computing device 204, as described herein.

Computing device 204 and/or client terminal(s) 212 include and/or are in communication with one or more physical user interfaces 208 that include a mechanism for a user to enter data and/or view data (e.g., enter an indication of the functional representation 216A and/or view the computed solution to the saddle problem), optionally within a GUI. Exemplary user interfaces 208 include, for example, one or more of, a touchscreen, a display, a keyboard, a mouse, and voice activated software using speakers and microphone.

Referring now back to FIG. 1, at 102, a function of multiple variables, for which an unconstrained saddle point is to be computed, is provided, for example, entered by a user, obtained from a storage device (e.g., stored in a file and/or in code), and/or computed by code.

Optionally, the function denotes a combination of generation of candidate data elements by a generator network of a GAN, and ability of a discriminator network of the GAN to distinguish the generated candidate data elements from a distribution of training data elements of a training dataset. The generator network is trained to generate candidate data elements that the discriminator cannot statistically significantly distinguish from the distribution of the training data elements by computing the unconstrained saddle point of the function.

Optionally, the function is not strictly convex-concave. In at least some implementations, the approach described herein converges to the saddle point in functions that are not strictly convex-concave. In contrast, standard approaches such as naïve gradient methods do not guarantee convergence in functions that are not strictly convex-concave, leading instead to diverging oscillatory solutions.

The unconstrained saddle-point problem may be mathematically defined as follows:

$$\min_{x \in \mathbb{R}^M} \max_{y \in \mathbb{R}^N} f(x, y), \quad (1)$$

where $f$ is the provided function, which is twice continuously differentiable and the first derivative is L Lipschitz continuous on $\mathbb{R}^M \times \mathbb{R}^N$. The point $(x^*, y^*)$ is a global saddle-point iff $$f(x^*,y) \leq f(x^*,y^*) \leq f(x,y^*) \forall x \in \mathbb{R}^M, y \in \mathbb{R}^N. \quad (2)$$

Finding a global saddle-point may be computationally intractable. At least some implementations described herein are based on the assumption that local convexity-concavity of the objective in which case eq. (2) holds in a local r neighborhood ball of $(x^*,y^*)$, which is denoted $B_2((x^*, y^*), r)$. $(x^*, y^*)$ denotes to be a local stable saddle-point when the gradient is zero and the second order derivatives are positive definite in x and negative definite in y.

At 104, a combination of a first subspace denoting a first set of variable of the function for minimization thereof, and a second subspace denoting a second set of variables of the function for maximization thereof, is computed. The combination is for simultaneous minimization of the first subspace and maximization of the second subspace. The combination is in contrast to standard approaches for computing subspaces, where the subspace is only for maximization therefore (without simultaneous minimization), or only for minimization thereof (without simultaneous maximization).

A dimension of the first subspace and the second subspace is smaller than a dimension of the function. Optionally, the dimension of the first subspace and the second subspace is 10 or less, or 15 or less, or 7 or less, or other values. In at least some implementations, the 10 (or other values) or less dimensions of the first and second subspace enable computing directions along the first and second substances for the next location in a computationally practical manner (i.e., reasonable processing time and/or reasonable computational resources and/or reasonable amount of memory and/or data storage), for example, using second order optimization approaches such as Newton. Such second order optimizations cannot be computed in a practical manner for larger dimensions, for example, for the function itself rather than for the first and second subspaces.

Optionally, each one of the first subspace and the second subspace include three or more dimensions. In at least some implementations, the 3 or more dimensions define the minimum amount of data that is needed in order to compute the saddle point according to the approach described herein. Optionally, the three or more dimensions of the first subspace include a first current gradient of the first current location, and a second current gradient of the second current location. Alternatively or additionally, the three or more dimensions of the first subspace include a first previous gradient of a previous first location, and a second previous gradient of a previous second location. Alternatively or additionally, the three or more dimensions of the first subspace include a first previous direction and a first previous step-size of a previous first location, and a second previous direction and a second previous step-size of a previous second location.

First, the concept of subspace optimization, and standard approaches are discussed, followed by the approach of the present disclosure. The core idea of subspace optimization is to perform the optimization of a function in a small subspace spanned by a set of directions obtained from an available oracle. Denoting a function g: $\mathbb{R}^n \to \mathbb{R}$ to be minimized and $P_k \in \mathbb{R}^n \times \mathbb{R}^d$, d<<n as the set of d directions at iteration k, an iterated subspace optimization method aims at solving the following minimization problem $$\alpha_k = \arg\min_{\alpha \in \mathbb{R}^d} g(x_k + P_k\alpha), \quad (3)$$

followed by the update rule $x_{k+1} = x_k + P_k\alpha_k$. The dimensions of the problem are then reduced from the optimization space $\mathbb{R}^n$, to the controlled subspace in $\mathbb{R}^d$ spanned by the columns of $P_k$.

The subspace structure may vary depending on the chosen optimization technique. Krylov descent method defines the subspace as span$\{H^0\nabla g, \ldots, H^{d-1}\nabla g\}$ for some preconditioning matrix H, e.g. $H = \nabla^2 g$, for example, as described with reference to [40]. Related to Krylov subspaces, the Conjugate Gradient method, for example, as described with reference to [17] reduces the search space to current gradient and previous step, such that span$\{p_k, \nabla g\}$, where $p_k = x_k - x_{k-1}$. Nemirovski [28] provided optimal worst case complexity of the method in convex setting by defining the subspace as $$\text{span}\left\{\nabla g(x), x_k - x_0, \sum_{j=0}^{k} w_j \nabla g(x_j)\right\},$$

with appropriate weights $\{w_j\}_{j=0}^k$. The SESOP process, for example, as described with reference to [26] extends this method by adding the previous search directions $\{p_{k-i}\}_{i=0}^{d-3}$. Thus, the method provides optimal worst case complexity, generalizes the quadratic CG method, and allows truncated approximation of the expanding manifold property on non-linear objectives. Also, more directions can be added to enrich the subspace in order to improve the convergence for example, as described with reference to [9, 42].

Standard approaches to iterative formulation of subspace optimization are extended by at least some implementations described herein, to saddle-point problems, using primal-dual subspace optimization, and an adapted generic optimization framework.

The subspace saddle-point problem may be defined as $$\min_{\alpha \in \mathbb{R}^m} \max_{\beta \in \mathbb{R}^n} f(x_k + P_k\alpha, y_k + Q_k\beta), \quad (4)$$

where it is assumed that m<<M and n<<N. Matrices $P_k$ and $Q_k$ define the subspace structure at iteration k. The subspace optimization can be solved exactly or approximately. The new iterate is of the form $$\begin{pmatrix} x_{k+1} \\ y_{k+1} \end{pmatrix} = \begin{pmatrix} x_k \\ y_k \end{pmatrix} + \eta_k \begin{pmatrix} P_k\alpha \\ Q_k\beta \end{pmatrix}, \quad (5)$$

where $\eta_k$ is the step size obtained via outer optimization (i.e. original problem), and the procedure stops if convergence tests are satisfied. This formulation allows flexibility in definition of the search space. The following simple but challenging example illustrates this property. The bi-linear game $f(x,y) = x^T y$, for example, as described with reference to [38] diverges when search is performed over one dimensional anti-gradient/gradient direction. However, convergence can be reached if the optimization is performed separately over the primal and dual variables, as shown in the following theorem.

Theorem 1 Consider the saddle-point problem $f(x,y) = x^T y$ and the update from eq. (5), where $\alpha$ and $\beta$ are obtained by solving eq.(4) with $P_k = \nabla_x f(x_k, y_k)$ and $Q_k = \nabla_y f(x_k, y_k)$. Then, $\forall \eta_k \in (0, 2f(x_k,y_k)^2/\|P_k\|^2\|Q_k\|^2)$ the procedure converges to optimum. Also, the gradient method (i.e. $-\alpha = \beta > 0$), diverges $\forall \eta_k > 0$.

It is noted that the fact that joint subspace optimization is convergent while independent (alternating) subspace optimization is divergent in this unstable case. Following the subspace minimization strategy to use more than current gradient, a saddle-point in the subspace spanned by first order information is sought. Namely, the current gradient (e.g., as described with reference to [28]), previous gradients, and the previous search steps in x and y, such that span$\{P_k\}$ = span$\{S_k^x, G_k^x\}$ and span$\{Q_k\}$ = span$\{S_k^y, G_k^y\}$, where $S_k^u = \{p_{k-l-1}^u, \ldots, P_{k-1}^u\}$ and $G_k^u = \{\nabla_u f(x_{k-l}, y_{k-l}), \ldots, \nabla_u f(x,y)\}$, with $p_k^u = u_k - u_{k-1}$. Other directions can be used or added to improve the convergence as well. Expanding the subspace with more directions can enrich the subspace but enables a subjective trade-off between computational cost and speed of convergence. The subspace formulation described herein may adapts existing standard approaches, e.g. the gradient method described with reference to [37] or Optimistic Mirror Descent described with reference to [36, 12]. In order to improve the convergence, the proposed framework can be combined with other methods, such as weighted averaging of iterates as final solution, for example, as described with reference to [4], and/or consensus optimization, for example, as described with reference to [24] as modification of the objective.

An analysis of the convergence conditions of the subspace optimization approach, in terms of the norm of gradient, i.e. convergence to stationary point, is now provided. Consider $z_k = [x_k, y_k]$ where [.,.] denotes vectors concatenation. The direction denoted $d_k = [P_k\alpha, Q_k\beta] = R_k[\alpha, \beta] := R_k\gamma$, where $R_k$ is the block matrix populated with $P_k$ and $Q_k$ in the block diagonal and zero elsewhere. It is assumed $R_k$ has linearly independent columns. From the first order expansion, there exists sufficiently small $\zeta > 0$ such that $$f(z_{k+1}) = f(z_k + \zeta d_k) = f(z_k) + \zeta(\nabla f(z_k, d_k) + o(\zeta^2 \|d_k\|)). \quad (6)$$

Thus, by taking derivative of eq. (6), $\nabla f(z_{k+1}) \approx \nabla f(z_k) + \zeta \nabla^2 f(z_k) d_k$. Since the target is decreasing the gradient norm to reach convergence, the following equation is used:

$$\|\nabla f(z_{k+1})\|^2 = \|\nabla f(z_k)\|^2 + 2\zeta \nabla f(z_k)^T \nabla^2 f(z_k) d_k + o(\zeta^2 \|^2 f(z_k) d_k\|). \quad (7)$$

Thereafter, the sufficient condition for convergence to local stationary point is $\nabla f(z_k)^T \nabla^2 f(z_k) d_k < 0$. For example, the steepest descent/ascent direction is convergent in the case of strongly convex-concave problem since in that case $\nabla f(z_k)^T \nabla^2 f(z_k) \nabla f(z_k) < 0$. The previous equation may be reformulated in terms of the subspace parameters such that, since $\nabla_\gamma f(z+R\gamma) = R^T \nabla_z f(z+R\gamma)$, the following equations are obtained:

$$\|\nabla f(z_{k+1})\|^2 \approx \nabla f(z_k)\|^2 + 2\zeta \nabla f(z_k)^T \nabla^2 f(z_k) R_k\gamma = \|\nabla f(z_k)\|^2 + 2\zeta \nabla_\gamma f(z_k + R_k\gamma)^T|_{\gamma=0} R_k^+{}^T R_k \nabla_\gamma^2 f(z_k + R_k\gamma)|_{\gamma=0}\gamma, \quad (8)$$

where, $R_k^+$ denote the Moore€"Penrose pseudoinverse of matrix $R_k^T$. Thus, assuming single Newton step in subspace $\gamma = -\nu \nabla_\gamma^2 f(z_k + R_k\gamma)^{-1}|_{\gamma=0} \nabla \gamma f(z_k + R_k\gamma)|_{\gamma=0}$, $\exists \nu > 0$ such that $$\|\nabla f(z_{k+1})\|^2 = \|\nabla f(z_k)\|^2 - 2\nu\zeta \|R_k^+ \nabla_\gamma f(z_k + R_k\gamma)_{\gamma=0}\|^2. \quad (9)$$

According to eq (9), in the neighborhood of the current point $z_k$, Newton step in the subspace domain decreases gradient norm of the original problem, and thus induces global convergence to stationary point. However, contrary to the minimization setup (e.g., as described with reference to [9]) where subspace optimization are descent methods, exact convergence to stationary point in subspaces (i.e. $\nabla_\gamma f(z_k +$ $R_k\gamma)=0$) does not necessarily enforce convergence in the original problem space, as shown in Theorem 1. This is mainly due to the interaction term $\nabla_{xy}f(x,y)$ present in eq. (7) via the Hessian matrix.

Based on the above analysis, the extension of subspace optimization to saddle-point problems as described in at least some implementations of the present disclosure, is then not straightforward.

At 106, a combination of a current location including a first current location within the first subspace and a second current location within the second subspace is selected. The selection may be performed, for example, randomly, based on a set of rules, and/or other approach. Once a first selection is made, and the process is iterated, the combination of the current location is selected based on (e.g., is set as) the previous combination of the previous location of the previous iteration.

At 108, from the combination of the current location, a combination of a direction including a first direction along the first subspace denoting a maximal of a first gradient at the first current location of the first subspace, and a second direction along the second subspace denoting a minimal of a second gradient at the second current location of the second subspace, is computed.

Optionally, the combination of the direction is computed based on an inner optimization approach, optionally, using a second order optimization approach, for example, based on Newton's method in optimization. In at least some implementations, the 10 or less dimensions of the first and second subspace enable computing the directions along the first and second substances for the next location in a computationally practical manner (i.e., reasonable processing time and/or reasonable computational resources), for example, using second order optimization approaches such as Newton. Such second order optimizations cannot be computed in a practical manner for larger dimensions, for example, for the function itself rather than for the first and second subspaces.

Second order methods aim at finding roots of the gradient via solution of the second order expansion. Therefore, they can converge extremely fast to saddle-points, especially in the proximity of the solution where the problem has a good quadratic approximation. The major drawback is the prohibitive computational cost for both the computation and inversion of the Hessian. However, as implemented in at least some embodiments, in a small subspace setting, second order methods, s.a. (Quasi-)Newton, can be handled efficiently. In particular, the computation of the Hessian in the subspace is performed via Hessian product with the direction vectors, for example, as described with reference to [34]. Another approach is via automatic differentiation tool, since $(\partial^2 f)\cdot v=\partial(\partial f\cdot v)$. Hessian inversion is computationally negligible in low dimensional subspace (generally up to ten dimensions). The approach described herein can be further accelerated using frozen or truncated Hessian strategies, especially when the Hessian remains almost unchanged in the vicinity of the solution. The second order proximal subspace optimization may be performed iteratively until the convergence (or maximum number of iterations) is reached, as follows:

$$\gamma_{k+1} = \gamma_k - \eta_k \tilde{H}_\gamma^{-1}(z_k + R_k\gamma_k)\nabla_\gamma \tilde{f}(z_k + R_k\gamma_k) \quad (11)$$

$$= \gamma_k - \eta_k (R_k^T(\tilde{H}_z(z_k + R_k\gamma_k))R_k)^{-1} R_k^T \nabla_z \tilde{f}(z_k + R_k\gamma_k)$$

$$= \gamma_k - \eta_k (R_k^T(H_z(z_k + R_k\gamma_k) + T)R_k)^{-1} R_k^T \nabla_z \tilde{f}(z_k + R_k\gamma_k),$$

where the last two equations illustrate the computational complexity of the approach, through the Hessian-vector product over the subspaces matrix $R_k$, and the low dimensional subspace Hessian inversion. Here, the matrices $H_u(v)$ and $H_u(v)$ denote the variable metric matrices reduced to $\nabla_u^2 f(v)$ and $\nabla_u^2 f(v)$ respectively in the Newton scheme. Also, T denote the dampening matrix that ensures stability of the former saddle-point system, such that $$T = \tau\left(\begin{array}{c|c} I & 0 \\ \hline 0 & -I \end{array}\right)$$

Here $\eta_k$ is the step size commonly obtained via the line search procedure. In the case of the Newton optimization in the subspace being computationally intensive (e.g. high dimensional subspace or prohibitive derivatives computation), a Quasi-Newton method can be deployed instead. In the saddle-point setting, Quasi-Newton alternatives that do not enforce positive definiteness of the Hessian can be used, such as symmetric rank-one (SR1) with usual handling of the update factors, for example, as described with reference to [32].

Reference is now made to FIG. 9, which is a pseudocode for sequential subspace optimization framework for saddle-point problems, in accordance with some embodiments.

Referring now back to FIG. 1, at 110, a combination of a step-size including a first step-size from the first current location along the first direction of the first subspace, and a second step-size from the second current location along the second direction of the second subspace, is computed. The first step-size is to a next first location within the first subspace. The second step-size is to a next second location within the second subspace.

Optionally, to ensure convergence of inner and/or outer optimization, the subspace optimization may be solved in a constrained local region. The direction obtained from the subspace optimization may be corrected by controlling the outer step size $\eta_k$ as in eq. (5) via an adapted line-search procedure.

Optionally, the auxiliary subspace saddle problem (e.g., as defined by equation (4)) is extended by adding proximal point regularization, for example, as described with reference to [22]. Optionally, the step-size is a combination of a first step-size within the first subspace and a second step-size within the second subspace. A first maximal value may be defined for the first step-size. A second maximal value may be defined for the second. In at least some implementations, the proximal approach reduces oscillation behavior which may occur in min-max games, and/or improves stability of the subspace optimization procedure. The proximal approach helps ensure the existence of a saddle-point in potentially degenerate substances, avoiding divergence, in a trust-region fashion.

Optionally, the first maximal value for the first step-size is set according to a moving average over multiple previous first step-sizes computed from previous iterations. The second maximal value for the second step-size may be set according to a moving average over multiple previous second step-sizes computed from multiple previous iterations. In at least some implementations, the reduction in oscillation and/or improvement of the stability may be based on averaging over iterations provided by the proximal approach.

In terms of mathematical representation, at each iteration the subspace proximal problem is solved over $\tilde{f}(x,y)$, namely $$\min_{\alpha \in \mathbb{R}^m} \max_{\beta \in \mathbb{R}^n} \tilde{f}(x_k + P_k\alpha, y_k + Q_k\beta) := f(x_k + P_k\alpha, y_k + Q_k\beta) + \frac{\tau_k}{2}\|x_k + P_k\alpha - \bar{x}_k\|^2 - \frac{\tau_k}{2}\|y_k + Q_k\beta - \bar{y}_k\|^2, \quad (10)$$

where $\bar{x}_k$ and $\bar{y}_k$ denote the primal and dual prox-centers respectively (e.g. moving average or previous point). The proximal approach may provide, for example, allowing averaging over iterations, reducing the oscillation behavior typical to min-max games (e.g., as described with reference to [38]), and/or improves stability of the optimization procedure. Foremost, it may ensures the existence of a saddle-point in potentially degenerate subspaces, avoiding divergence, in a trust-region fashion, for example, as described with reference to [39].

Common line-search backtracking methods, for example, as described with reference to [33] cannot be applied straightforwardly to the saddle-point problems, since implementing search over the function primal and dual values can diverge (e.g., bi-linear game). In at least some implementations of the present disclosure, a technical solution is provided by performing backtracking line search over the gradient norm to both ensure faster convergence, and/or prevent potential divergence after the inner subspace optimization.

Optionally, the step-size is computed based on a norm of a gradient at the current location of the combination of the first subspace and the second subspace in the direction. The step-size may be computed by performing a saddle-point backtracking line search process. An exemplary approach for computing the step-size is performed by selecting an initial value of the step-size, and iteratively reducing the initial value of the step-size until the norm of the gradient at a candidate next location defined as the initial value of the step-size from current location in the direction, is below the norm of the gradient at the current location plus a threshold value.

In at least some implementations, performing a backtracking line search over the norm of the gradient of the combination of the first subspace and the second subspace ensures faster convergence and/or prevents potential divergence after the inner subspace optimization. Common line-search backtracking approaches which are used for to find only a minimum for a function, or only a maximum for a function, cannot be applied straightforwardly to saddle-point problems, since implementing such line-search over the function's (x,y) values for which simultaneous minimization and maximization is south may diverge (e.g., bi-linear game).

Reference is now made to FIG. 8, which is a pseudocode for a process that performs a saddle backtracking line search, in accordance with some embodiments. This step size search procedure is used in both inner (fast convergence in subspace) and outer (step correction) optimization. In the experiments described below in the "Examples" section, Inventors chose c=0 for less computational overhead and set v=0.5. The number of line-search iterations was limited to 30. The following theorem 2, based on the analysis of the convergence conditions of the subspace optimization approach described herein, states the convergence of the pseudocode of FIG. 8 for the standard gradient method (memoryless subspaces).

Theorem 2: Consider function $f(x,y)$ with stable saddle-point $(x^*,y^*)$. Assume the subspace is spanned by the anti-gradient and gradient directions for the primal and dual variables, respectively. Then, the pseudocode of FIG. 8 converges to the optimum for every $(x_0, y_0) \in B_2((x^*, y^*), r)$.

Referring now back to FIG. 1, at 112, one or more features described with reference to 106 to 110 are iterated in multiple iterations. In each iteration, the combination of the previous location determined in the previous iteration is set to a combination of the next location including the next first location and the next second location of the current iteration. The combination of the first subspace and the second subspace of the next iteration are updated according to the location of the previous iteration.

The iterations may be terminated when the current location (or next location) meets a requirement denoting the unconstrained saddle point.

At 114, the saddle point is provided, for example, presented on a display, stored in a memory and/or data storage device (e.g., as a file, as an entry in a database), forwarded to a remote device, and/or inputted into another computational process designed to receive a saddle point as input.

Optionally, the saddle point is used to train the GAN, and/or indicates that the GAN has been sufficiently trained. The GAN may be sufficiently trained when the candidate data elements generated by the generator network cannot be distinguished by the discriminator network from training data elements of a training dataset.

Various embodiments and aspects of the present disclosure as delineated hereinabove and as claimed in the claims section below find experimental and/or calculated support in the following examples.

EXAMPLES

Reference is now made to the following examples, which together with the above descriptions illustrate some embodiments of the present disclosure in a not necessarily limiting fashion.

As described herein, the computational experiments described below provide evidence that the computational approach for computing an unconstrained saddle point of at least some implementations described herein improves a computer that computes the unconstrained saddle point, by reducing the computation time and/or computational resources of the computer, in comparison to other standard approaches.

Inventors compared the approach described in the present disclosure (denoted OUR) for computing the saddle point to other known approaches: GDA refers to the gradient method described with reference to [37], DAS refers to the dual averaging scheme described with reference to [31], OGDA is the optimistic gradient method described with reference to [11], and EGDA refers to the extrinsic gradient method described with reference to [41]. All the methods but DAS are implemented using the proposed backtracking line search for improved convergence. When line search did not converge for EGDA, Inventors searched for optimal step size. In the following, the proximal centers according to the approach described herein are set to previous point (i.e. $x_{k-1}$ and $y_{k-1}$). In all the presented experiments, the subspace is populated by the current gradient (m=n=1), by previous gradient (m=n=2), and by previous search directions (m=n≥3). The machine precision $\epsilon$ is set to single precision $10^{-8}$ and the maximum number of inner optimization iterations is limited to 10. In all the figures k denote the iteration number. Unless stated otherwise all the methods use the same oracle.

A first set of experimental and/or calculated evaluations related to the following quadratic saddle-point problem:

$$\min_x \max_y \frac{1}{2}(x^T A_x x + y^T A_y y) + x^T C y + b_x^T x + b_y^T y, \quad (12)$$

where the matrices $A_x$, $A_y$, C are generated from the normal distribution and have pre-defined condition numbers. Namely, Inventors generate a standard Gaussian matrix with i.i.d. entries, perform its SVD and substitute diagonal singular values with an array of log-uniform random values in predefined range. The dimension of the optimization problem is set to M=1500, N=500. Inventors plotted the distance to optimum (leftmost plot) and the norm of the gradient (second plot from left). Also, Inventors show the impact of the condition number of the block-matrices in A on the mean convergence rate $$K^{-1} \sum_k^K \|z_{k+1} - z^*\| / \|z_k - z^*\|$$

(rightmost plot). Here x-axis represents the inverse condition number $\kappa^{-1}$. These first three plots are obtained with a three dimensional subspace for each variable. Finally, Inventors show the effect of the subspace dimension on the convergence of the proposed method (third from left). For this experiment Inventors add time comparison with the Chambolle-Pock algorithm (CP) with step size set according to the interaction term matrix to ensure proven convergence [6]. For fairness, Inventors do not assume any closed form solution is given, all the derivatives are computed at each iteration using the same automatic differentiation tool for all the methods.

Figure 3:
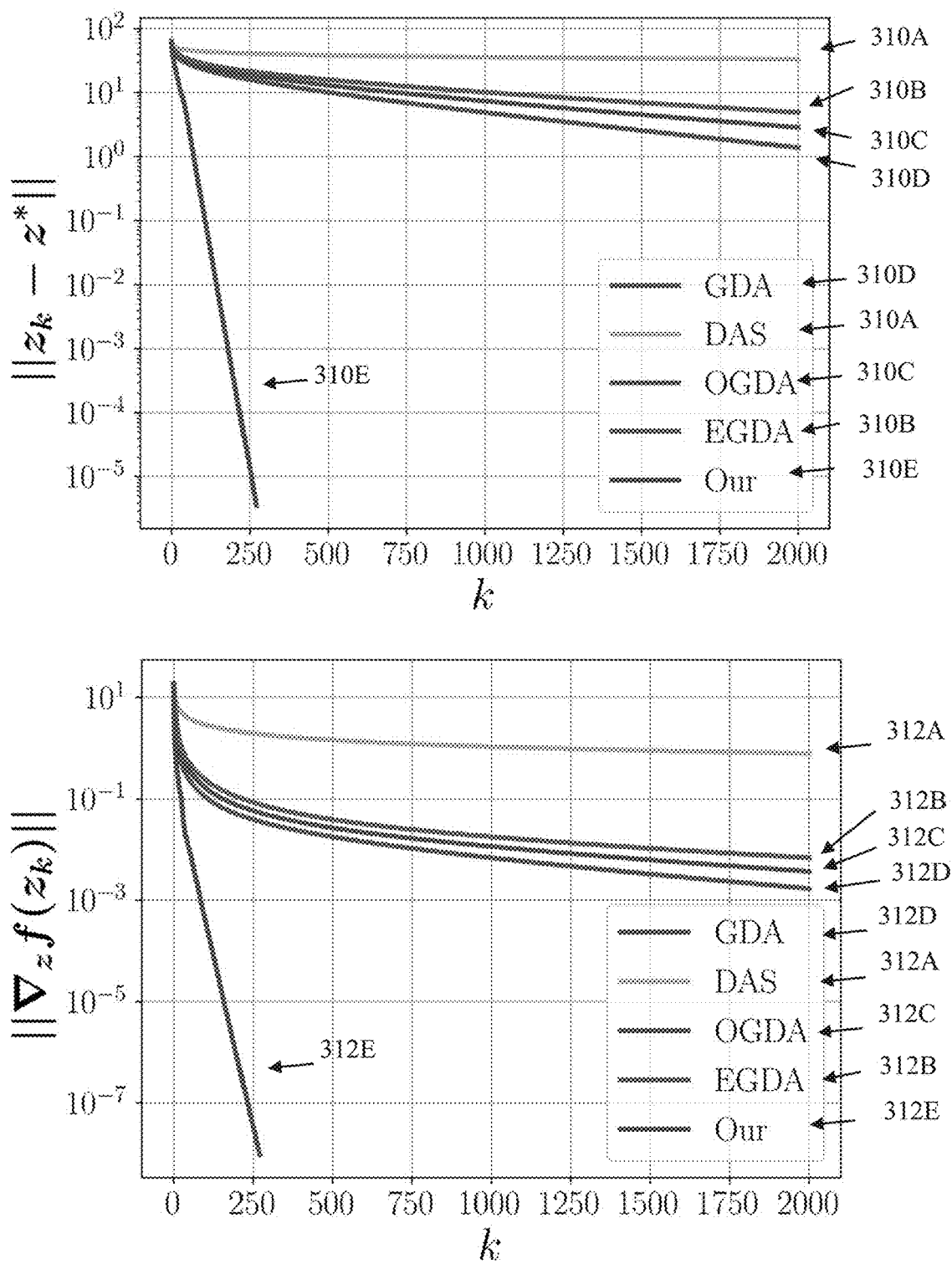
FIG. 3 includes graphs presenting computational results for a first experiment related to the separable quadratic saddle point problem, in accordance with some embodiments.
Figure 3:
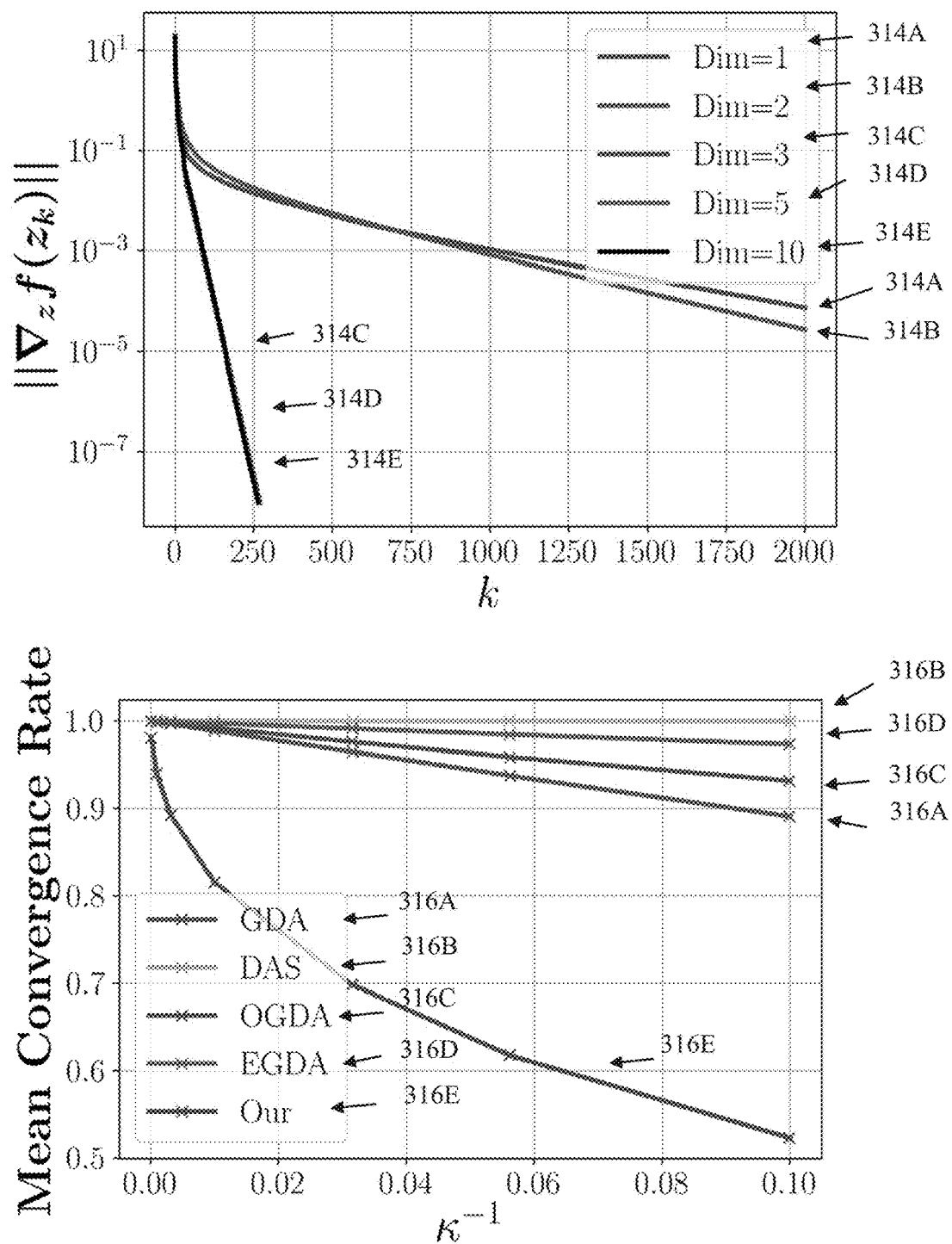

Reference is now made to FIG. 3, which includes graphs presenting computational results for a first experiment related to the separable quadratic saddle point problem, in accordance with some embodiments. Inventors considered a separable problem with $A_x>0$, $A_y<0$ and C=0. The two matrices are conditioned with the condition numbers $\kappa(A_x)=10^3$, $\kappa(A_y)=10^2$. FIG. 3 shows that the approach based on the present disclosure keeps its manifold expansion property throughout the last search direction (m=n≥3), and therefore converges extremely fast to the solution. In contrast, the convergence of other standard methods is very slow. This is due to the difficulty of the gradient method to converge in ill-conditioned scenarios, and due to the unified step size for the primal and the dual directions.

Figure 4:
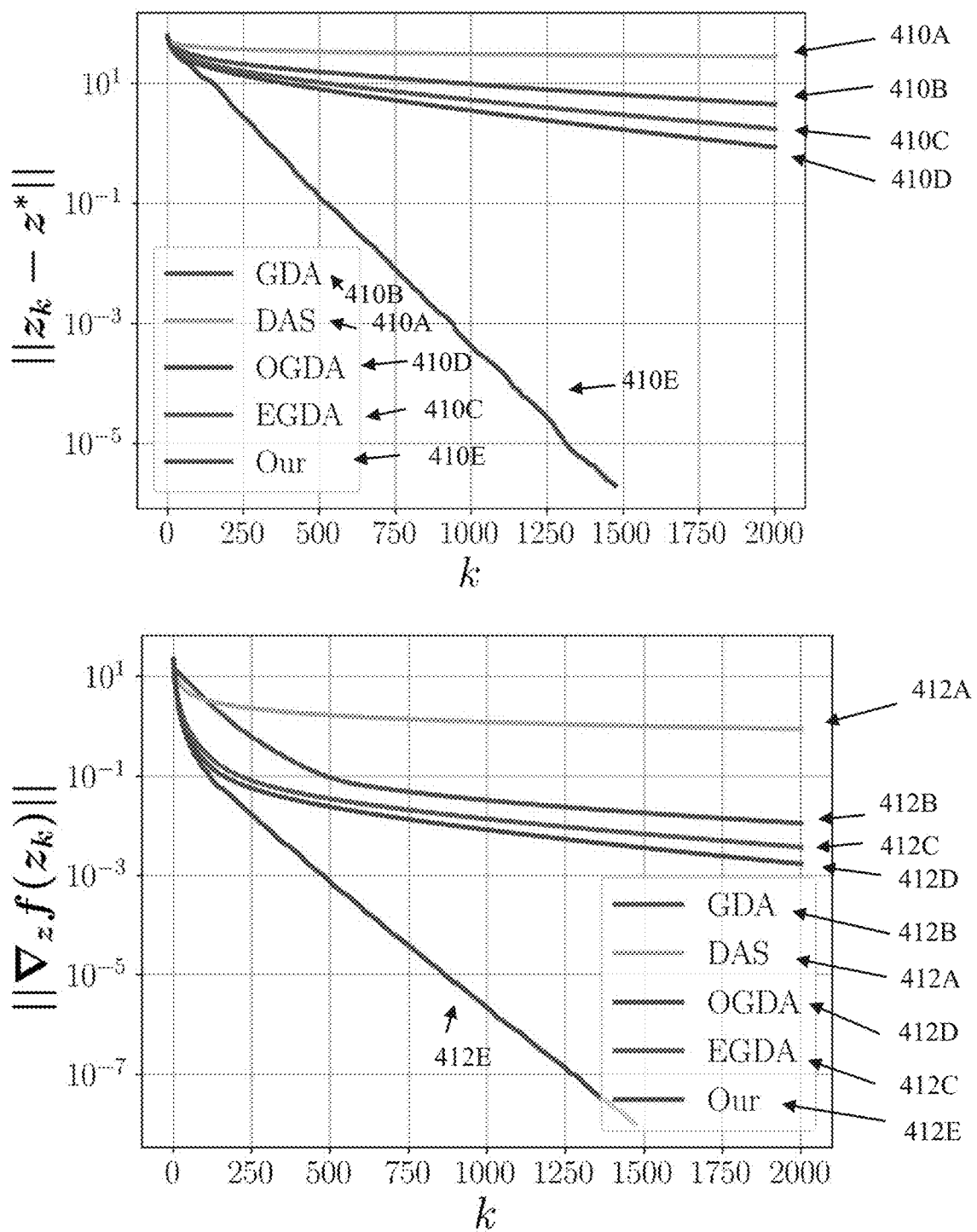
FIG. 4 includes graphs presenting computational results for a second experiment related to the separable quadratic saddle point problem, in accordance with some embodiments.
Figure 4:
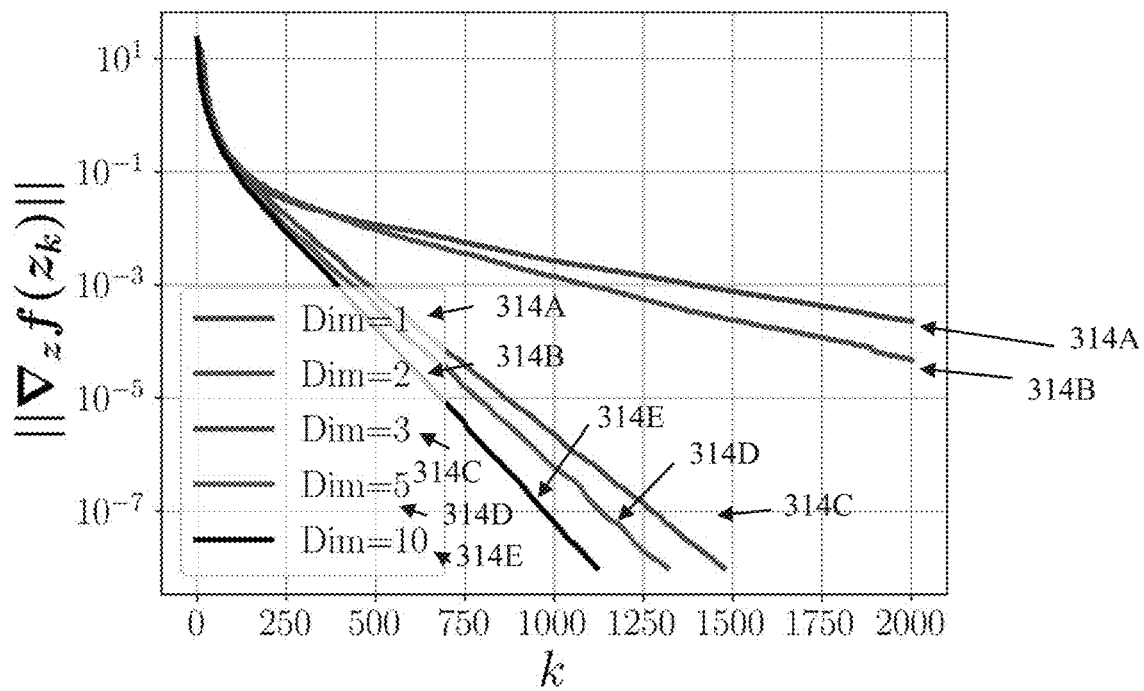
Figure 4:
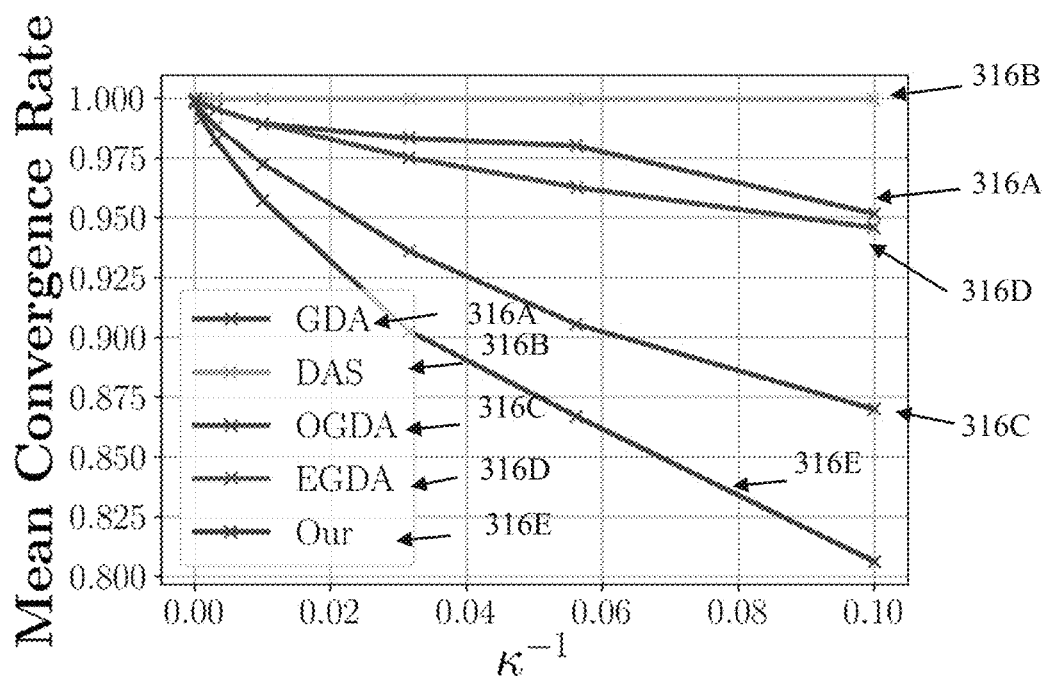

Reference is now made to FIG. 4, which includes graphs presenting computational results for a second experiment related to the separable quadratic saddle point problem, in accordance with some embodiments. Inventors consider the stable quadratic saddle point problem with $A_x>0$, $A_y<0$ and C to be full rank matrices. Here, all the block-matrices are conditioned with condition number $\kappa(A_x)=10^3$, $\kappa(A_y)=10^2$, $\kappa(C)=10^3$. Inventors observe the superiority of based on the approach described herein, while the advantage of using more directions is clear in handling the interaction matrix C, as compared to gradient based methods.

Figure 5:
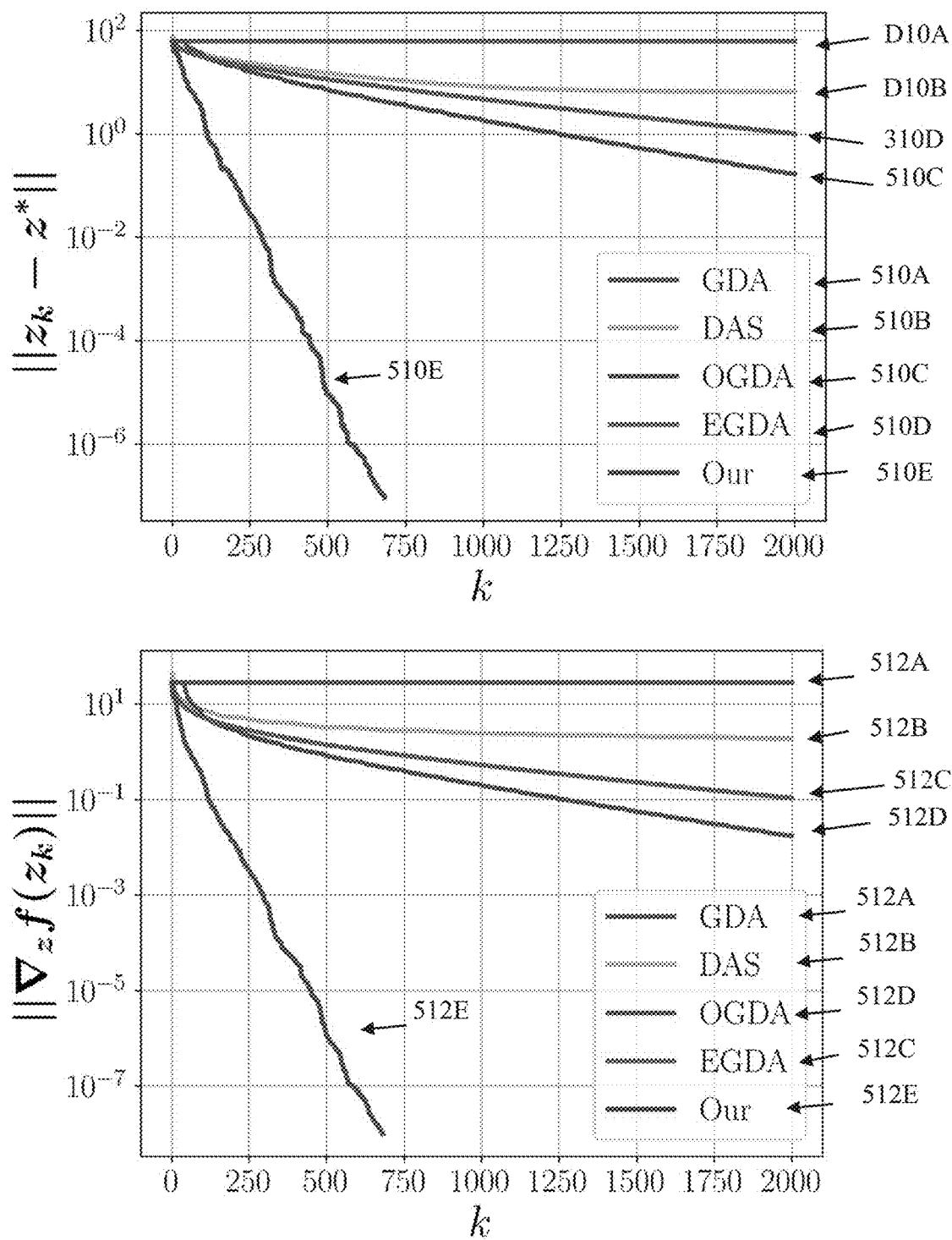
FIG. 5 includes graphs presenting computational results for a third experiment related to the separable quadratic saddle point problem, in accordance with some embodiments.
Figure 5:
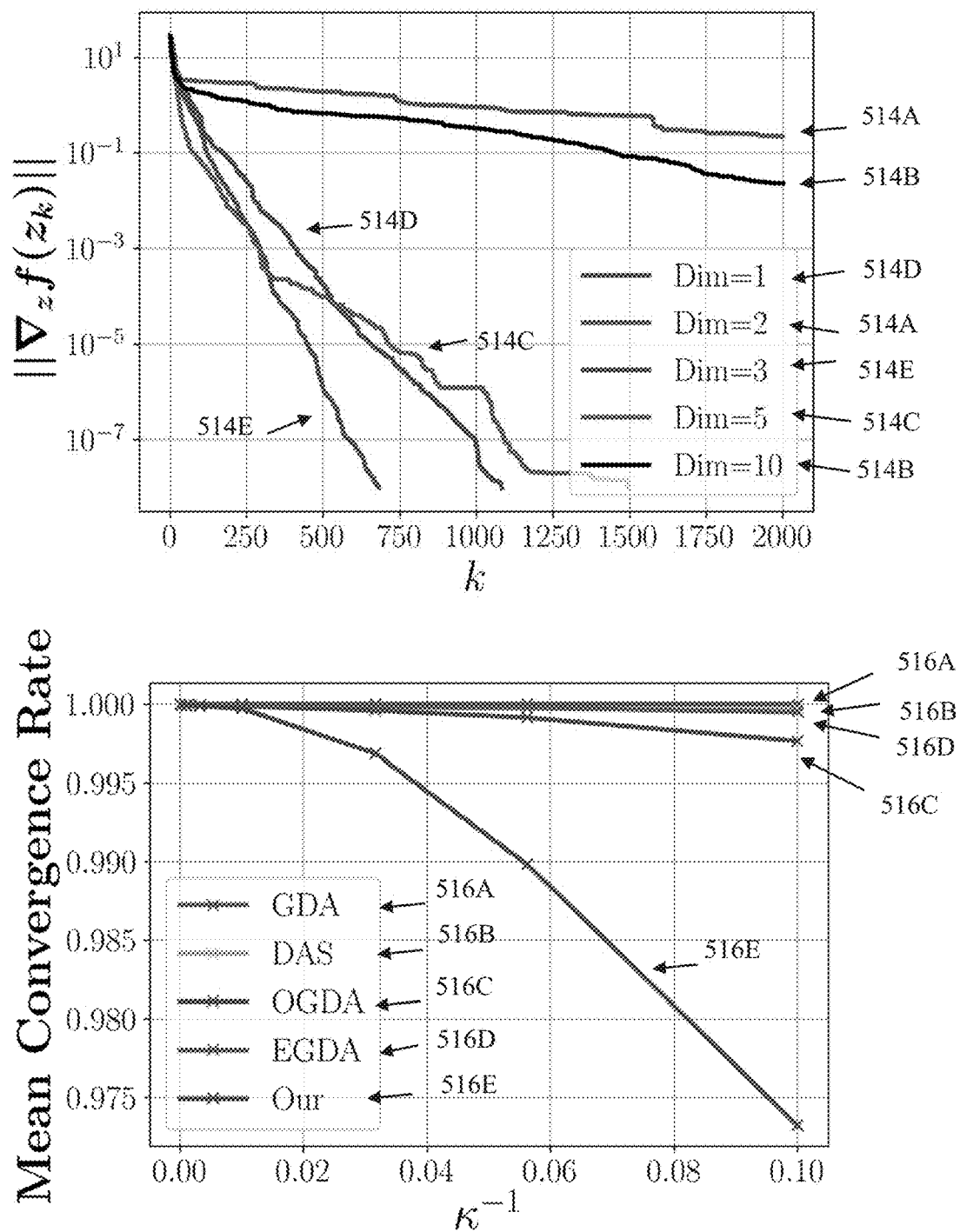

Reference is now made to FIG. 5, which includes graphs presenting computational results for a third experiment related to the separable quadratic saddle point problem, in accordance with some embodiments. Inventors deployed the bi-linear game problem, where $A_x=0$, $A_y=0$ and C is a full rank matrix, such that $\kappa(C)=10^2$. Here M=N=1000 so there exist only one solution to the equivalent system of linear equations. The approach described herein performs significantly better, as compared to other first-order standard approaches. In the bi-linear case, it can be seen that increasing the size of the subspace is not necessarily beneficial.

Inventors show the superiority of the approach in term of computational time for the different settings in Table 1 below. Table 1 presents mean computation time in seconds of the presented methods until convergence threshold is reached, for the different quadratic settings. ∞ denotes non-convergence and '–' denotes slower convergence than the approach described herein by at least a factor of 30.

TABLE 1

| Setting | GDA | DAS | OGDA | EGDA | CP | Our |
|---|---|---|---|---|---|---|
| Separable | 42.5 | — | 73.1 | 60.7 | 15.9 | 5.9 |
| Stable | 144.1 | — | 49.3 | 55.4 | — | 38.1 |
| Unstable | ∞ | — | 34.3 | 33.6 | — | 14.7 |

A second set of experimental and/or calculated evaluations related to the alternating direction method of multipliers (ADMM). ADMM is a powerful algorithm that solves convex optimization problems by splitting them into simpler problems that are easier to handle. Inventors consider the smooth Lasso regression problem, where the smoothness is enforced in order to allow efficient continuous optimization. The problem is defined as follows $$\min_x \frac{1}{2}\|Ax - b\|^2 + \lambda \sum_j \varphi_s(x_j), \quad (13)$$

with $\lambda \in \mathbb{R}^+$. Here $x_j$ denotes the $j^{th}$ component of vector x, and $\varphi_s(t)$ denotes the scalar non-linearity that implements the smooth convex approximation $\Sigma_j \varphi_s(x_j)$ of the $l_1$ norm such that $$\varphi_s(t) = |t| - s\ln(1 + |t|/s), s \in (0, \infty), \quad (14)$$

where the scaling factor s defines the degree of smoothness. This choice of $\varphi_s(t)$ yields well defined shrinkage as described with reference to [14]. The original ADMM algorithm can be summarized in the following three steps: minimization in former primal variable x, minimization in separable variable w, and update of the dual variable y as described with reference to [3]. The Lasso setting may be reformulated as a saddle-point problem of the augmented Lagrangian $$\min_{x,w} \max_y \left\{ \frac{1}{2}\|Ax - b\|^2 + \lambda \sum_j \varphi_s(w_j) + y^T(x - w) + \frac{\rho}{2}\|x - w\|^2 \right\} \quad (15)$$

where ρ denotes the penalty parameter.

Figure 6:
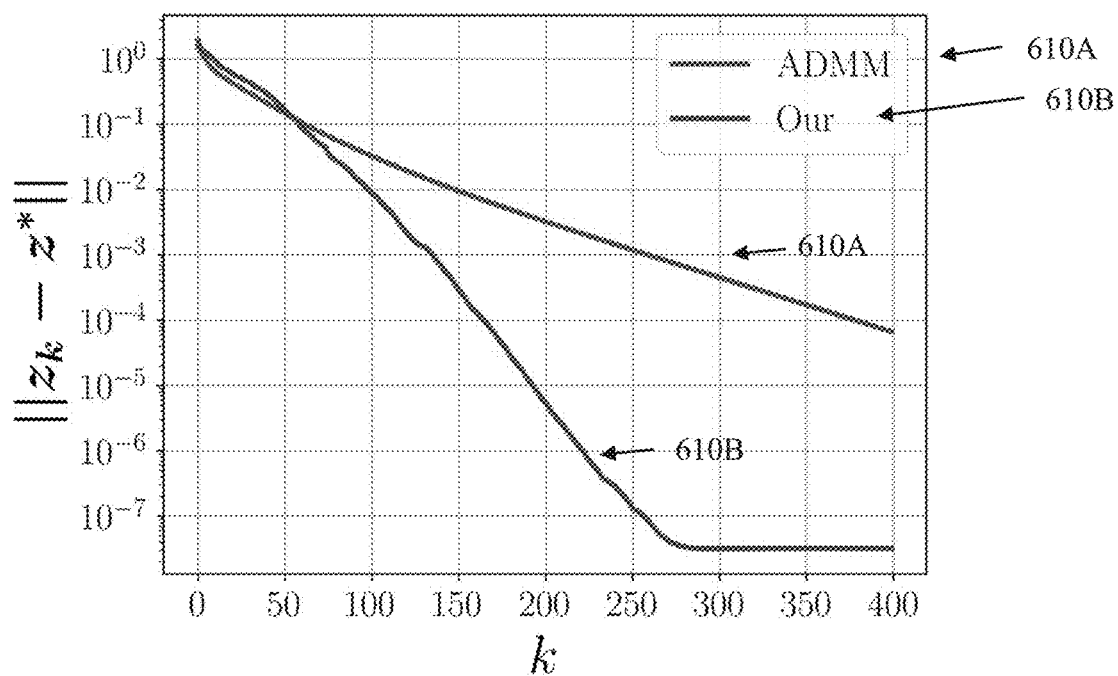
FIG. 6 includes graphs depicting convergence results of the ADMM method with smoothing constant $s=10^{-3}$, versus the approach described herein proposed subspace method boosted by the ADMM directions populating the subspace matrices, in accordance with some embodiments.
Figure 6:
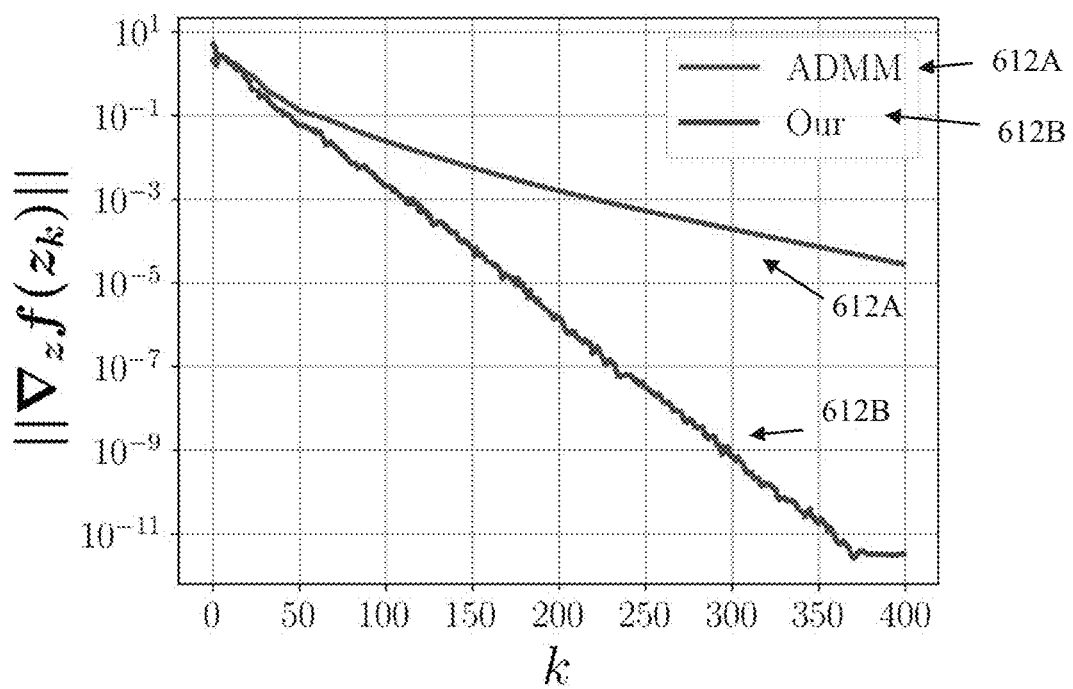

Reference is now made to FIG. 6, which includes graphs depicting convergence results of the ADMM method with smoothing constant $s=10^{-3}$, versus the approach described herein proposed subspace method boosted by the ADMM directions populating the subspace matrices, in accordance with some embodiments. The data setting is the same as described with reference to [3], Section (11.1). The boosting obtained by the approach described herein is significant both in speed and accuracy.

A third set of experimental and/or calculated evaluations related to generative adversarial networks. Generative Adversarial Networks became recently one of the most popular applications of the minimax approach, for example, as described with reference to [16]. Inventors tested the proposed method in deterministic setting of the Dirac GAN scheme proposed with reference to [23] by expanding the dimensions of the problem such that $$f(x,y)=\phi(-x^T Y)+(y^T c), \quad (16)$$

for some scalar function $\phi$. Here, c denotes the high dimensional Dirac distribution value that was sampled from the Normal distribution. The primal and dual variables represent the data generator and discriminator, respectively.

Figure 7:
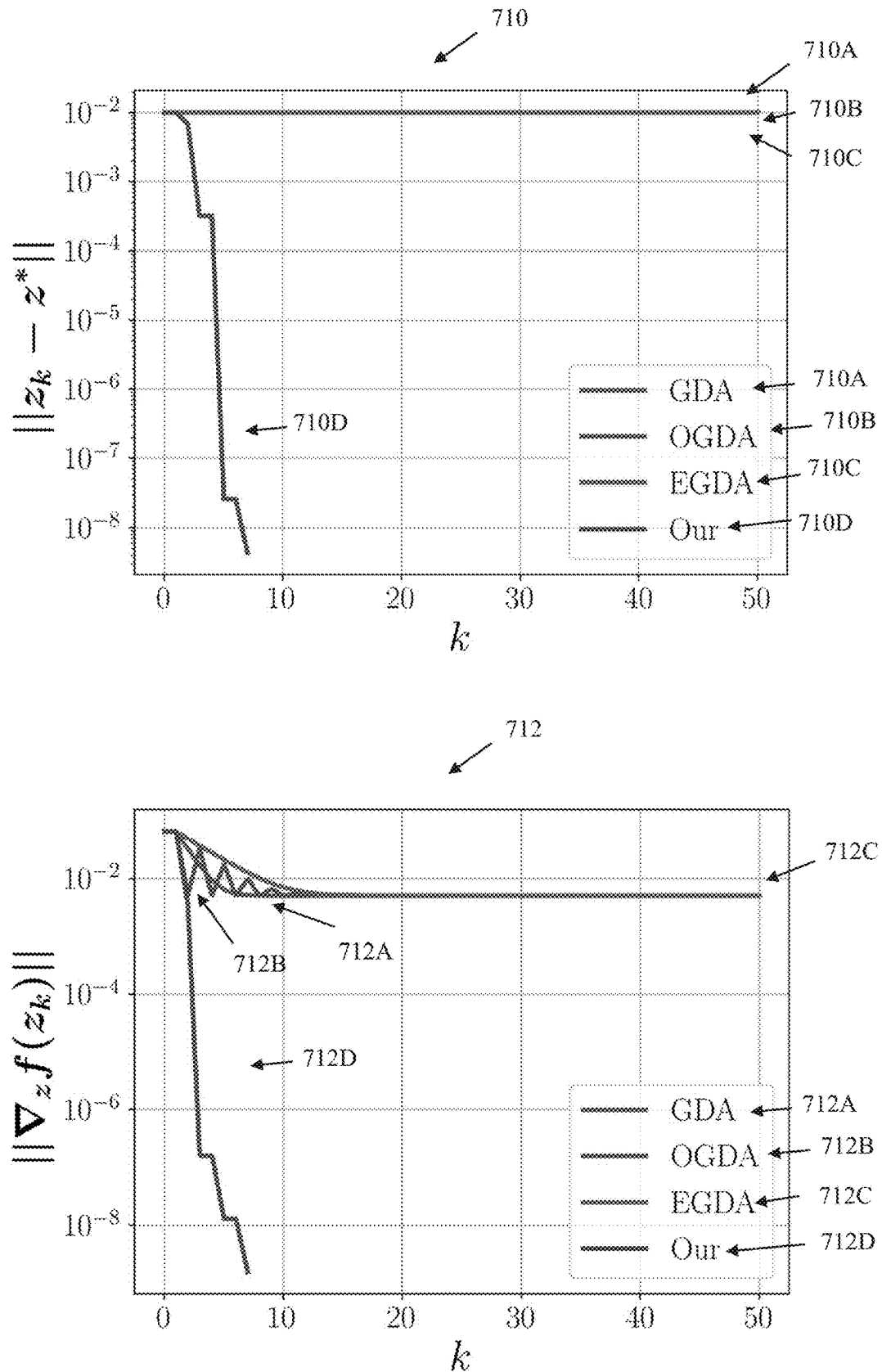
FIG. 7 includes graphs depicting the distance to optimum, the gradient norm of the generator and discriminator, the influence of the subspace dimension, and the influence of the proximal factor on convergence for different initialization, in accordance with some embodiments.

Reference is now made to FIG. 7, which includes graphs depicting the distance to optimum 710, the gradient norm of the generator and discriminator 712, the influence of the subspace dimension 714, and the influence of the proximal factor on convergence for different initialization 716, in accordance with some embodiments. Therein, the common sigmoid cross-entropy loss $\phi(t)=-\ln(1+e^{-t})$ as described with reference to [16] is used. The dimension of the original optimization problem is set to M=N=1000. Since the objective is concave-concave, the competing methods fail to converge to saddle-point, and diverge to saturation regions, for example, as described with reference to [23]. The proximal operator prevents the method from diverging, and allows faster convergence to optimum as depicted in the rightmost plot.

REFERENCES

[1] Kenneth J Arrow, Leonid Hurwicz, and Hirofumi Uzawa. Studies in linear and non-linear programming. 1958.

[2] Aharon Ben-Tal, Laurent El Ghaoui, and Arkadi Nemirovski. Robust optimization, volume 28. Princeton University Press, 2009.

[3] Stephen Boyd, Neal Parikh, Eric Chu, Borja Peleato, Jonathan Eckstein, et al. Distributed optimization and statistical learning via the alternating direction method of multipliers. Foundations and TrendsR in Machine learning, 3(1):1-122, 2011.

[4] Ronald E Bruck Jr. On the weak convergence of an ergodic iteration for the solution of variational inequalities for monotone operators in hilbert space. Journal of Mathematical Analysis and Applications, 61(l):159-164, 1977.

[5] Emmanuel J Candes, Justin K Romberg, and Terence Tao. Stable signal recovery from incomplete and inaccurate measurements. Communications on Pure and Applied Mathematics: A Journal Issued by the Courant Institute of Mathematical Sciences, 59(8):1207-1223, 2006.

[6] Antonin Chambolle and Thomas Pock. A first-order primal-dual algorithm for convex problems with applications to imaging. Journal of mathematical imaging and vision, 40(1):120-145, 2011.

[7] Tony F Chan, Selim Esedoglu, and Mila Nikolova. Algorithms for finding global minimizers of image segmentation and denoising models. SIAM journal on applied mathematics, 66(5):1632-1648, 2006.

[8] Ashish Cherukuri, Bahman Gharesifard, and Jorge Cortes. Saddle-point dynamics: conditions for asymptotic stability of saddle points. SIAM Journal on Control and Optimization, 55(1):486-511, 2017.

[9] A R Conn, Nick Gould, A Sartenaer, and Ph L Toint. On iterated-subspace minimization methods for nonlinear optimization. Linear and Nonlinear Conjugate Gradient-Related Methods, pages 50-78, 1996.

[10] EE Cragg and AV Levy. Study on a supermemory gradient method for the minimization of functions. Journal of Optimization Theory and Applications, 4(3):191-205, 1969.

[11] Constantinos Daskalakis, Andrew Ilyas, Vasilis Syrgkanis, and Haoyang Zeng. Training gans with optimism. arXiv preprint arXiv:1711.00141, 2017.

[12] Constantinos Daskalakis and Ioannis Panageas. The limit points of (optimistic) gradient descent in min-max optimization. In Advances in Neural Information Processing Systems, pages 9236-9246, 2018.

[13] John E Dennis Jr and Kathryn Turner. Generalized conjugate directions. Linear Algebra and its Applications, 88:187-209, 1987.

[14] Michael Elad, Boaz Matalon, and Michael Zibulevsky. Coordinate and subspace optimization methods for linear least squares with non-quadratic regularization. Applied and Computational Harmonic Analysis, 23(3):346-367, 2007.

[15] Diego Feijer and Fernando Paganini. Stability of primal-dual gradient dynamics and applications to network optimization. Automatica, 46(12):1974-1981, 2010.

[16] Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pages 2672-2680, 2014.

[17] Magnus Rudolph Hestenes and Eduard Stiefel. Methods of conjugate gradients for solving linear systems, volume 49. NBS Washington, D C, 1952.

[18] GM Korpelevich. The extragradient method for finding saddle points and other problems. Matecon, 12:747-756, 1976.

[19] Brian Kulis and Peter L Bartlett. Implicit online learning. In Proceedings of the 27th International Conference on Machine Learning (ICML-10), pages 575-582, 2010.

[20] Kevin Leyton-Brown and Yoav Shoham. Essentials of game theory: A concise multidisciplinary introduction. Synthesis lectures on artificial intelligence and machine learning, 2(1):1-88, 2008.

[21] Tengyuan Liang and James Stokes. Interaction matters: A note on non-asymptotic local convergence of generative adversarial networks. arXiv preprint arXiv:1802.06132, 2018.

[22] Bernard Martinet. Brève communication. régularisation d'inequations variationnelles par approximations successives. Revue française d'informatique et de recherche operationnelle. Série rouge, 4(R3):154-158, 1970.

[23] Lars Mescheder, Andreas Geiger, and Sebastian Nowozin. Which training methods for gans do actually converge? arXiv preprint arXiv:1801.04406, 2018.

[24] Lars Mescheder, Sebastian Nowozin, and Andreas Geiger. The numerics of gans. In Advances in Neural Information Processing Systems, pages 1825-1835, 2017.

[25] A Miele and J W Cantrell. Study on a memory gradient method for the minimization of functions. Journal of Optimization Theory and Applications, 3(6):459-470, 1969.

[26] Guy Narkiss and Michael Zibulevsky. Sequential subspace optimization method for large-scale unconstrained problems. Technical Report CCIT 559, Technion—Israel Institute of Technology, Faculty of Electrical Engineering, 2005.

[27] Angelia Nedi'c and Asuman Ozdaglar. Subgradient methods for saddle-point problems. Journal of optimization theory and applications, 142(1):205-228, 2009.

[28] Arkadi Nemirovski. Orth-method for smooth convex optimization. Izvestia A N SSSR, Transl.: Eng. Cybern. Soviet J. Comput. Syst. Sci, 2:937-947, 1982.

[29] Arkadi Nemirovski. Prox-method with rate of convergence o (1/t) for variational inequalities with lipschitz continuous monotone operators and smooth convex-concave saddle point problems. SIAM Journal on Optimization, 15(1):229-251, 2004.

[30] Yu Nesterov. Smooth minimization of non-smooth functions. Mathematical programming, 103(1):127-152, 2005.

[31] Yurii Nesterov. Primal-dual subgradient methods for convex problems.
Mathematical programming, 120(1):221-259, 2009.

[32] Jorge Nocedal and S Wright. Numerical optimization. Series in operations research and financial engineering, Springer, New York, 2006.

[33] Jorge Nocedal and S Wright. Numerical Optimization—Line Search Methods, pages 30-65. Springer New York, Ney York, N.Y., 2006.

[34] Barak A. Pearlmutter. Fast exact multiplication by the hessian. Neural Computation, 6:147-160, 1994.

[35] Leonid Denisovich Popov. A modification of the arrow-hurwicz method for search of saddle points. Mathematical notes of the Academy of Sciences of the USSR, 28(5): 845-848, 1980.

[36] Sasha Rakhlin and Karthik Sridharan. Optimization, learning, and games with predictable sequences. In Advances in Neural Information Processing Systems, pages 3066-3074, 2013.

[37] R Tyrrell Rockafellar. Monotone operators and the proximal point algorithm. SIAM journal on control and optimization, 14(5):877-898, 1976.

[38] Tim Salimans, Ian Goodfellow, Wojciech Zaremba, Vicki Cheung, Alec Radford, and Xi Chen. Improved techniques for training gans. In Advances in Neural Information Processing Systems, pages 2234-2242, 2016.

[39] Danny C Sorensen. Newton's method with a model trust region modification. SIAM Journal on Numerical Analysis, 19(2):409-426, 1982.

[40] Oriol Vinyals and Daniel Povey. Krylov subspace descent for deep learning. In Artificial Intelligence and Statistics, pages 1261-1268, 2012.

[41] Abhay Yadav, Sohil Shah, Zheng Xu, David Jacobs, and Tom Goldstein. Stabilizing adversarial nets with prediction methods. arXiv preprint arXiv:1705.07364, 2017.

[42] Michael Zibulevsky and Michael Elad. L1-L2 optimization in signal and image processing. Signal Processing Magazine, IEEE, 27(3):76-88, 2010.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant functions will be developed and the scope of the term function is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. An apparatus for computing an unconstrained saddle point of a function of a plurality of variables, comprising:
   a processor and a non-transitory storage medium, the non-transitory storage medium carrying a code that, when executed by the processor, causes the processor to:
   compute, for the function, a combination of a first subspace denoting a first set of variables of the function for minimization, and a second subspace denoting a second set of variables of the function for maximization,
   wherein a dimension of the first subspace and the second subspace is smaller than a dimension of the function; and, in a plurality of iterations:
      select a combination of a current location including a first current location within the first subspace and a second current location within the second subspace;
      compute, from the combination of the current location, a combination of a direction including a first direction along the first subspace denoting a maximal of a first gradient at the first current location of the first subspace, and a second direction along the second subspace denoting a minimal of a second gradient at the second current location of the second subspace;
      compute a combination of a step-size including a first step-size from the first current location along the first direction of the first subspace, and a second step-size from the second current location along the second direction of the second subspace, the first step-size to a next first location within the first subspace and the second step-size to a next second location within the second subspace;
      set the combination of the current location to a combination of the next location including the next first location and the next second location;
      update the combination of the first subspace and the second subspace according to the next location; and
      terminate the iterations when the next location meets a requirement denoting the unconstrained saddle point.

2. The apparatus of claim 1, wherein the function denotes a generative adversarial network (GAN), and the non-transitory storage medium further comprising code that, when executed by the processor, causes the processor to:
   provide a training dataset of training data elements for training the GAN;
   provide the GAN comprising a discriminator network and a generator network,
   wherein the function denotes a combination of generation of candidate data elements by the generator and ability of the discriminator network to distinguish the generated candidate data elements from a distribution of the training data elements; and
   train the generator network to generate candidate data elements that the discriminator cannot statistically significantly distinguish from the distribution of the training data elements by computing the unconstrained saddle point of the function.

3. The apparatus of claim 1, wherein the dimension of the first subspace and the second subspace is 10 or less.

4. The apparatus of claim 1, wherein the step-size is a combination of a first step-size within the first subspace and a second step-size within the second subspace, and further comprising defining a first maximal value for the first step-size, and a second maximal value for the second.

5. The apparatus of claim 4, wherein the first maximal value for the first step-size is set according to a moving average over a plurality of previous first step-sizes computed from a plurality of previous iterations, and the second maximal value for the second step-size is set according to a moving average over a plurality of previous second step-sizes computed from a plurality of previous iterations.

6. The apparatus of claim 1, the non-transitory storage medium further comprising code that, when executed by the processor, causes the processor to compute the step-size based on a norm of a gradient at the current location of the combination of the first subspace and the second subspace in the direction.

7. The apparatus of claim 6, wherein computing the step-size comprises:
   selecting an initial value of the step-size, and
   iteratively reducing the initial value of the step-size until the norm of the gradient at a candidate next location defined as the initial value of the step-size from current location in the direction, is below the norm of the gradient at the current location plus a threshold value.

8. The apparatus of claim 1, wherein the combination of the direction is computed using a second order optimization approach.

9. The apparatus of claim 8, wherein the second order optimization approach is based on Newton's method in optimization.

10. The apparatus of claim 1, wherein each one of the first subspace and the second subspace includes at least three dimensions.

11. The apparatus of claim 10, wherein the at least three dimensions of the first subspace include a first current gradient of the first current location, and a second current gradient of the second current location.

12. The apparatus of claim 10, wherein the at least three dimensions of the first subspace include a first previous gradient of a previous first location, and a second previous gradient of a previous second location.

13. The apparatus of claim 10, wherein the at least three dimensions of the first subspace include a first previous direction and a first previous step-size of a previous first location, and a second previous direction and a second previous step-size of a previous second location.

14. A method of computing an unconstrained saddle point of a function of a plurality of variables, comprising:
   computing, for the function, a combination of a first subspace denoting a first set of variables of the function for minimization, and a second subspace denoting a second set of variables of the function for maximization,
   wherein a dimension of the first subspace and the second subspace is smaller than a dimension of the function;
   in a plurality of iterations:

selecting a combination of a current location including a first current location within the first subspace and a second current location within the second subspace;

computing, from the combination of the current location, a combination of a direction including a first direction along the first subspace denoting a maximal of a first gradient at the first current location of the first subspace, and a second direction along the second subspace denoting a minimal of a second gradient at the second current location of the second subspace;

computing a combination of a step-size including a first step-size from the first current location along the first direction of the first subspace, and a second step-size from the second current location along the second direction of the second subspace, the first step-size to a next first location within the first subspace and the second step-size to a next second location within the second subspace;

setting the combination of the current location to a combination of the next location including the next first location and the next second location;

updating the combination of the first subspace and the second subspace according to the next location; and terminating the iterations when the next location meets a requirement denoting the unconstrained saddle point.

15. A computer program product for computing an unconstrained saddle point of a function of a plurality of variables, comprising a non-transitory medium storing a computer program that, when executed by at least one hardware processor, causes the at least one hardware processor to perform:

computing, for the function, a combination of a first subspace denoting a first set of variables of the function for minimization, and a second subspace denoting a second set of variables of the function for maximization, wherein a dimension of the first subspace and the second subspace is smaller than a dimension of the function;

in a plurality of iterations:

selecting a combination of a current location including a first current location within the first subspace and a second current location within the second subspace;

computing, from the combination of the current location, a combination of a direction including a first direction along the first subspace denoting a maximal of a first gradient at the first current location of the first subspace, and a second direction along the second subspace denoting a minimal of a second gradient at the second current location of the second subspace;

computing a combination of a step-size including a first step-size from the first current location along the first direction of the first subspace, and a second step-size from the second current location along the second direction of the second subspace, the first step-size to a next first location within the first subspace and the second step-size to a next second location within the second subspace;

setting the combination of the current location to a combination of the next location including the next first location and the next second location;

updating the combination of the first subspace and the second subspace according to the next location; and terminating the iterations when the next location meets a requirement denoting the unconstrained saddle point.

* * * * *